(12) United States Patent
Dussan

(10) Patent No.: US 10,908,262 B2
(45) Date of Patent: *Feb. 2, 2021

(54) LADAR TRANSMITTER WITH OPTICAL FIELD SPLITTER/INVERTER FOR IMPROVED GAZE ON SCAN AREA PORTIONS

(71) Applicant: AEYE, Inc., Fairview Heights, IL (US)

(72) Inventor: Luis Carlos Dussan, Dublin, CA (US)

(73) Assignee: AEYE, INC., Fairview Heights, IL (US)

( * ) Notice: Subject to any disclaimer, the term of this patent is extended or adjusted under 35 U.S.C. 154(b) by 1006 days.

This patent is subject to a terminal disclaimer.

(21) Appl. No.: 15/431,065

(22) Filed: Feb. 13, 2017

(65) Prior Publication Data

US 2017/0242103 A1 Aug. 24, 2017

Related U.S. Application Data

(60) Provisional application No. 62/297,126, filed on Feb. 18, 2016, provisional application No. 62/439,378, filed on Dec. 27, 2016.

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4814* (2013.01); *G01S 17/06* (2013.01); *G01S 17/42* (2013.01);
(Continued)

(58) Field of Classification Search
CPC .. G02B 27/14; G02B 27/141; G02B 26/0833; G02B 26/101; G01S 17/42; G01S 17/06; G01S 7/4817; G01S 7/4814
(Continued)

(56) References Cited

U.S. PATENT DOCUMENTS

| 4,579,430 A | 4/1986 | Bille |
| 5,552,893 A | 9/1996 | Akasu |

(Continued)

FOREIGN PATENT DOCUMENTS

| CN | 1424591 A | 6/2003 |
| CN | 102023082 A | 4/2011 |

(Continued)

OTHER PUBLICATIONS

"Compressed Sensing," Wikipedia, 2019, downloaded Jun. 22, 2019 from https://en.wikipedia.org/wiki/Compressed_sensing, 16 pgs.

(Continued)

*Primary Examiner* — Mark Hellner
(74) *Attorney, Agent, or Firm* — Thompson Coburn LLP

(57) ABSTRACT

Disclosed herein is a scanning ladar transmitter that employs an optical field splitter/inverter to improve the gaze characteristics of the ladar transmitter on desirable portions of a scan area. Also disclosed is the use of scan patterns such as Lissajous scan patterns for a scanning ladar transmitter where a phase drift is induced into the scanning to improve the gaze characteristics of the ladar transmitter on desirable portions of the scan area.

65 Claims, 16 Drawing Sheets

(51) Int. Cl.
*G01S 17/42* (2006.01)
*G01S 17/06* (2006.01)
*G02B 26/08* (2006.01)
*G02B 26/10* (2006.01)
*G02B 27/14* (2006.01)

(52) U.S. Cl.
CPC ....... *G02B 26/0833* (2013.01); *G02B 26/101* (2013.01); *G02B 27/14* (2013.01); *G02B 27/141* (2013.01)

(58) Field of Classification Search
USPC ........................................................ 356/5.01
See application file for complete search history.

(56) References Cited

U.S. PATENT DOCUMENTS

| | | | |
|---|---|---|---|
| 5,596,600 A | 1/1997 | Dimos et al. | |
| 5,625,644 A | 4/1997 | Myers | |
| 5,638,164 A | 6/1997 | Landau | |
| 5,808,775 A | 9/1998 | Inagaki et al. | |
| 5,815,250 A | 9/1998 | Thomson et al. | |
| 5,831,719 A | 11/1998 | Berg et al. | |
| 6,031,601 A | 2/2000 | McCusker et al. | |
| 6,205,275 B1 | 3/2001 | Melville | |
| 6,245,590 B1* | 6/2001 | Wine | G02B 26/0833 438/14 |
| 6,288,816 B1 | 9/2001 | Melville et al. | |
| 6,330,523 B1 | 12/2001 | Kacyra et al. | |
| 6,704,619 B1 | 3/2004 | Coleman et al. | |
| 6,723,975 B2* | 4/2004 | Saccomanno | G01Q 5/005 250/203.6 |
| 6,847,462 B1 | 1/2005 | Kacyra et al. | |
| 6,926,227 B1 | 8/2005 | Young et al. | |
| 7,038,608 B1 | 5/2006 | Gilbert | |
| 7,206,063 B2 | 4/2007 | Anderson et al. | |
| 7,236,235 B2 | 6/2007 | Dimsdale | |
| 7,397,019 B1 | 7/2008 | Byars et al. | |
| 7,436,494 B1 | 10/2008 | Kennedy et al. | |
| 7,532,311 B2 | 5/2009 | Henderson et al. | |
| 7,701,558 B2 | 4/2010 | Walsh et al. | |
| 7,800,736 B2 | 9/2010 | Pack et al. | |
| 7,894,044 B1 | 2/2011 | Sullivan | |
| 7,944,548 B2 | 5/2011 | Eaton | |
| 8,072,663 B2 | 12/2011 | O'Neill et al. | |
| 8,081,301 B2 | 12/2011 | Stann et al. | |
| 8,120,754 B2 | 2/2012 | Kaehler | |
| 8,228,579 B2 | 7/2012 | Sourani | |
| 8,427,657 B2 | 4/2013 | Milanovi | |
| 8,635,091 B2 | 1/2014 | Amigo et al. | |
| 8,681,319 B2 | 3/2014 | Tanaka et al. | |
| 8,896,818 B2 | 11/2014 | Walsh et al. | |
| 9,069,061 B1 | 6/2015 | Harwit | |
| 9,085,354 B1 | 7/2015 | Peeters et al. | |
| 9,128,190 B1 | 9/2015 | Ulrich et al. | |
| 9,261,881 B1 | 2/2016 | Ferguson et al. | |
| 9,278,689 B1 | 3/2016 | Delp | |
| 9,285,477 B1 | 3/2016 | Smith et al. | |
| 9,305,219 B2 | 4/2016 | Ramalingam et al. | |
| 9,315,178 B1 | 4/2016 | Ferguson et al. | |
| 9,336,455 B1 | 5/2016 | Withers et al. | |
| 9,360,554 B2 | 6/2016 | Retterath et al. | |
| 9,383,753 B1 | 7/2016 | Templeton et al. | |
| 9,437,053 B2 | 9/2016 | Jenkins et al. | |
| 9,516,244 B2 | 12/2016 | Borowski | |
| 9,575,184 B2 | 2/2017 | Gilliland et al. | |
| 9,581,967 B1 | 2/2017 | Krause | |
| 9,841,495 B2 | 12/2017 | Campbell et al. | |
| 9,885,778 B2 | 2/2018 | Dussan | |
| 9,897,687 B1 | 2/2018 | Campbell et al. | |
| 9,897,689 B2 | 2/2018 | Dussan | |
| 9,933,513 B2 | 4/2018 | Dussan et al. | |
| 9,958,545 B2 | 5/2018 | Eichenholz et al. | |
| 10,007,001 B1 | 6/2018 | LaChapelle et al. | |
| 10,042,043 B2 | 8/2018 | Dussan | |
| 10,042,159 B2 | 8/2018 | Dussan et al. | |
| 10,073,166 B2 | 9/2018 | Dussan | |
| 10,078,133 B2 | 9/2018 | Dussan | |
| 10,088,558 B2 | 10/2018 | Dussan | |
| 10,185,028 B2 | 1/2019 | Dussan et al. | |
| 10,215,848 B2 | 2/2019 | Dussan | |
| 10,379,205 B2 | 8/2019 | Dussan et al. | |
| 10,386,464 B2 | 8/2019 | Dussan | |
| 10,386,467 B2 | 8/2019 | Dussan et al. | |
| 10,495,757 B2 | 12/2019 | Dussan et al. | |
| 2002/0039391 A1 | 4/2002 | Wang et al. | |
| 2002/0176067 A1 | 11/2002 | Charbon | |
| 2003/0122687 A1 | 7/2003 | Trajkovic et al. | |
| 2003/0151542 A1 | 8/2003 | Steinlechner et al. | |
| 2003/0156658 A1 | 8/2003 | Dartois | |
| 2004/0156336 A1 | 8/2004 | McFarland et al. | |
| 2005/0057654 A1 | 3/2005 | Byren | |
| 2005/0216237 A1 | 9/2005 | Adachi et al. | |
| 2006/0007362 A1 | 1/2006 | Lee et al. | |
| 2006/0176468 A1 | 8/2006 | Anderson et al. | |
| 2006/0199936 A1 | 9/2006 | Liebman et al. | |
| 2006/0227315 A1 | 10/2006 | Beller | |
| 2006/0265147 A1 | 11/2006 | Yamaguchi et al. | |
| 2008/0136626 A1 | 6/2008 | Hudson et al. | |
| 2008/0159591 A1 | 7/2008 | Ruedin | |
| 2008/0231494 A1 | 9/2008 | Galati | |
| 2009/0059201 A1 | 3/2009 | Willner et al. | |
| 2009/0128864 A1 | 5/2009 | Inage | |
| 2009/0242468 A1 | 10/2009 | Corben et al. | |
| 2009/0292468 A1 | 11/2009 | Wu et al. | |
| 2009/0318815 A1 | 12/2009 | Barnes et al. | |
| 2010/0027602 A1 | 2/2010 | Abshire et al. | |
| 2010/0053715 A1 | 3/2010 | O'Neill et al. | |
| 2010/0165322 A1 | 7/2010 | Kane et al. | |
| 2010/0204964 A1 | 8/2010 | Pack et al. | |
| 2011/0066262 A1 | 3/2011 | Kelly et al. | |
| 2011/0085155 A1 | 4/2011 | Stann et al. | |
| 2011/0149268 A1 | 6/2011 | Marchant et al. | |
| 2011/0149360 A1 | 6/2011 | Sourani | |
| 2011/0153367 A1 | 6/2011 | Amigo et al. | |
| 2011/0260036 A1 | 10/2011 | Baraniuk et al. | |
| 2011/0282622 A1 | 11/2011 | Canter | |
| 2011/0317147 A1 | 12/2011 | Campbell et al. | |
| 2012/0038817 A1 | 2/2012 | McMackin et al. | |
| 2012/0038903 A1 | 2/2012 | Weimer et al. | |
| 2012/0044093 A1 | 2/2012 | Pala | |
| 2012/0044476 A1 | 2/2012 | Earhart et al. | |
| 2012/0236379 A1 | 9/2012 | da Silva et al. | |
| 2012/0249996 A1 | 10/2012 | Tanaka et al. | |
| 2012/0257186 A1 | 10/2012 | Rieger et al. | |
| 2014/0021354 A1 | 1/2014 | Gagnon et al. | |
| 2014/0078514 A1 | 3/2014 | Zhu | |
| 2014/0211194 A1 | 7/2014 | Pacala et al. | |
| 2014/0291491 A1 | 10/2014 | Shpunt et al. | |
| 2014/0300732 A1 | 10/2014 | Friend et al. | |
| 2014/0350836 A1 | 11/2014 | Stettner et al. | |
| 2015/0081211 A1 | 3/2015 | Zeng et al. | |
| 2015/0269439 A1 | 9/2015 | Versace et al. | |
| 2015/0285625 A1 | 10/2015 | Deane | |
| 2015/0304634 A1 | 10/2015 | Karvounis | |
| 2015/0331113 A1 | 11/2015 | Stettner et al. | |
| 2015/0334371 A1 | 11/2015 | Galera et al. | |
| 2015/0369920 A1* | 12/2015 | Setono | G01S 7/4972 356/3.09 |
| 2015/0378011 A1 | 12/2015 | Owechko | |
| 2015/0378187 A1 | 12/2015 | Heck et al. | |
| 2016/0003946 A1 | 1/2016 | Gilliland et al. | |
| 2016/0005229 A1 | 1/2016 | Lee et al. | |
| 2016/0041266 A1 | 2/2016 | Smits | |
| 2016/0047895 A1 | 2/2016 | Dussan | |
| 2016/0047896 A1 | 2/2016 | Dussan | |
| 2016/0047897 A1 | 2/2016 | Dussan | |
| 2016/0047898 A1 | 2/2016 | Dussan | |
| 2016/0047899 A1 | 2/2016 | Dussan | |
| 2016/0047900 A1 | 2/2016 | Dussan | |
| 2016/0047903 A1 | 2/2016 | Dussan | |
| 2016/0054735 A1 | 2/2016 | Switkes et al. | |
| 2016/0146595 A1 | 5/2016 | Boufounos et al. | |
| 2016/0274589 A1 | 9/2016 | Templeton et al. | |

(56) References Cited

U.S. PATENT DOCUMENTS

| | | |
|---|---|---|
| 2016/0293647 A1 | 10/2016 | Lin et al. |
| 2016/0379094 A1 | 12/2016 | Mittal et al. |
| 2017/0003392 A1 | 1/2017 | Bartlett et al. |
| 2017/0158239 A1 | 6/2017 | Dhome et al. |
| 2017/0199280 A1 | 7/2017 | Nazemi et al. |
| 2017/0205873 A1 | 7/2017 | Shpunt et al. |
| 2017/0211932 A1 | 7/2017 | Zadravec et al. |
| 2017/0219695 A1 | 8/2017 | Hall et al. |
| 2017/0234973 A1 | 8/2017 | Axelsson |
| 2017/0242102 A1 | 8/2017 | Dussan et al. |
| 2017/0242104 A1 | 8/2017 | Dussan |
| 2017/0242105 A1 | 8/2017 | Dussan et al. |
| 2017/0242106 A1 | 8/2017 | Dussan et al. |
| 2017/0242107 A1 | 8/2017 | Dussan et al. |
| 2017/0242108 A1 | 8/2017 | Dussan et al. |
| 2017/0242109 A1 | 8/2017 | Dussan et al. |
| 2017/0263048 A1 | 9/2017 | Glaser et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0307876 A1 | 10/2017 | Dussan et al. |
| 2018/0031703 A1 | 2/2018 | Ngai et al. |
| 2018/0075309 A1 | 3/2018 | Sathyanarayana et al. |
| 2018/0120436 A1 | 5/2018 | Smits |
| 2018/0143300 A1 | 5/2018 | Dussan |
| 2018/0143324 A1 | 5/2018 | Keilaf et al. |
| 2018/0188355 A1 | 7/2018 | Bao et al. |
| 2018/0224533 A1 | 8/2018 | Dussan et al. |
| 2018/0238998 A1 | 8/2018 | Dussan et al. |
| 2018/0239000 A1 | 8/2018 | Dussan et al. |
| 2018/0239001 A1 | 8/2018 | Dussan et al. |
| 2018/0239004 A1 | 8/2018 | Dussan et al. |
| 2018/0239005 A1 | 8/2018 | Dussan et al. |
| 2018/0284234 A1 | 10/2018 | Curatu |
| 2018/0306927 A1 | 10/2018 | Slutsky et al. |
| 2018/0341103 A1 | 11/2018 | Dussan et al. |
| 2018/0372870 A1 | 12/2018 | Puglia |
| 2019/0025407 A1 | 1/2019 | Dussan |
| 2019/0086514 A1 | 3/2019 | Dussan et al. |
| 2019/0086550 A1 | 3/2019 | Dussan et al. |
| 2019/0271767 A1 | 9/2019 | Keilaf et al. |
| 2020/0025886 A1 | 1/2020 | Dussan et al. |
| 2020/0025887 A1 | 1/2020 | Dussan et al. |

FOREIGN PATENT DOCUMENTS

| | | |
|---|---|---|
| CN | 102667571 A | 9/2012 |
| CN | 103033806 A | 4/2013 |
| CN | 103324945 A | 9/2013 |
| CN | 103885065 A | 6/2014 |
| EP | 1901093 A1 | 3/2008 |
| EP | 2957926 A1 | 12/2015 |
| JP | H11-153664 A | 6/1999 |
| JP | 2000509150 A | 7/2000 |
| WO | 2004034084 A1 | 4/2004 |
| WO | 2006/076474 A1 | 7/2006 |
| WO | 2008008970 A2 | 1/2008 |
| WO | 2012027410 A1 | 3/2012 |
| WO | 2016025908 A2 | 2/2016 |
| WO | 2017/143183 A1 | 8/2017 |
| WO | 2017/143217 A1 | 8/2017 |
| WO | 2018/152201 A1 | 8/2018 |

OTHER PUBLICATIONS

"Entrance Pupil," Wikipedia, 2016, downloaded Jun. 21, 2019 from https://enwikipedia.org/wiki/Entrance_pupil, 2 pgs.

Donoho, "Compressed Sensing", IEEE Transactions on Inmformation Theory, Apr. 2006, pp. 1289-1306, vol. 52, No. 4.

Extended European Search Report for EP Application 15832272.7 dated Mar. 14, 2018.

International Search Report and Written Opinion for PCT/US2018/018179 dated Jun. 26, 2018.

Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.

Office Action for U.S. Appl. No. 15/431,096 dated Nov. 14, 2017.

International Search Report and Written Opinion for PCT/US2017/018415 dated Jul. 6, 2017.

Analog Devices, "Data Sheet AD9680", 98 pages, 2014-2015.

Howland et al., "Compressive Sensing LIDAR for 3D Imaging", Optical Society of America, May 1-6, 2011, 2 pages.

International Search Report and Written Opinion for PCT/US15/45399 dated Feb. 2, 2016.

International Search Report and Written Opinion for PCT/US2017/018359 dated Jun. 19, 2017.

Kessler, "An afocal beam relay for laser XY scanning systems", Proc. of SPIE vol. 8215, 9 pages, 2012.

Maxim Integrated Products, Inc., Tutorial 800, "Design A Low-Jitter Clock for High Speed Data Converters", 8 pages, Jul. 17, 2002.

Moss et al., "Low-cost compact MEMS scanning LADAR system for robotic applications", Proc. of SPIE, 2012, vol. 8379, 837903-1 to 837903-9.

Redmayne et al., "Understanding the Effect of Clock Jitter on High Speed ADCs", Design Note 1013, Linear Technology, 4 pages, 2006.

Rehn, "Optical properties of elliptical reflectors", Opt. Eng. 43(7), pp. 1480-1488, Jul. 2004.

Sharafutdinova et al., "Improved field scanner incorporating parabolic optics. Part 1: Simulation", Applied Optics, vol. 48, No. 22, p. 4389-4396, Aug. 2009.

International Preliminary Report on Patentability or PCT/US2017/018415 dated Aug. 30, 2018.

Notice of Allowance for U.S. Appl. No. 15/896,241 dated Sep. 12, 2018.

Notice of Allowance for U.S. Appl. No. 15/896,254 dated Nov. 23, 2018.

Prosecution History for U.S. Appl. No. 15/644,242, filed Jul. 7, 2017, now U.S. Pat. No. 10042159, granted Aug. 7, 2018.

Hui et al, "Analysis of Scanning Characteristics of a Two-Dimensional Scanning Lidar", Infrared (Monthly), Jun. 2010, pp. 10-14, vol. 31 No. 6 (http://journal.sitp.ac.cn/hw).

Johnson et al., "Development of a Dual-Mirror-Scan Elevation-Monopulse Antenna System", Proceedings of the 8th European Radar Conference, 2011, pp. 281-284, Manchester, UK.

\* cited by examiner

| Optics | % 3 deg centerline |
|---|---|
| standard | 1% |
| field invert | 11% |
| overlapped invert | 13% |
Figure 9
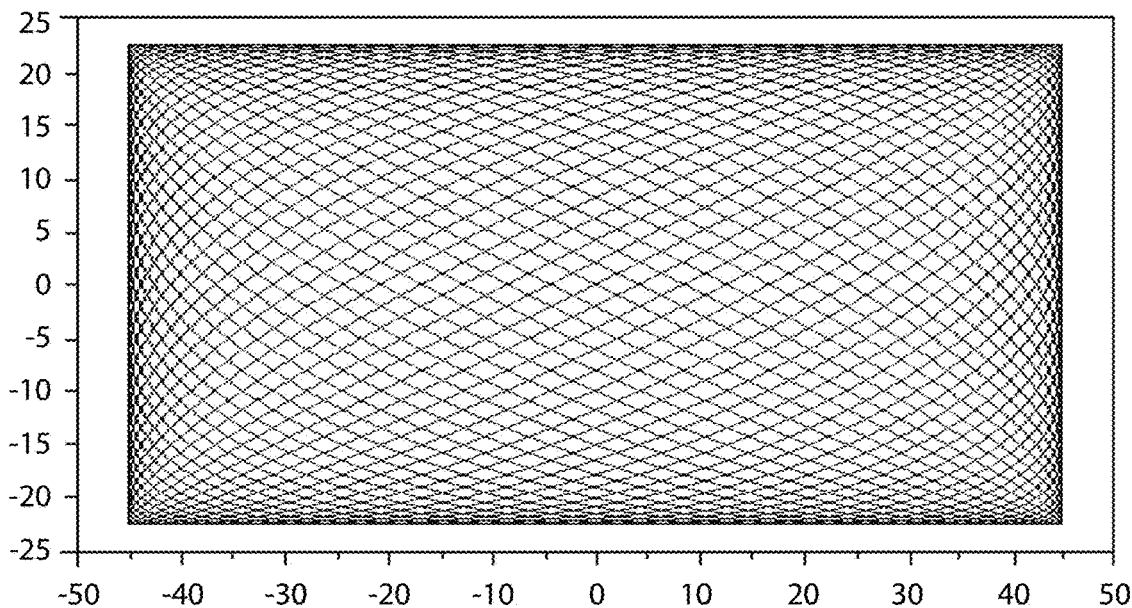
Figure 10A
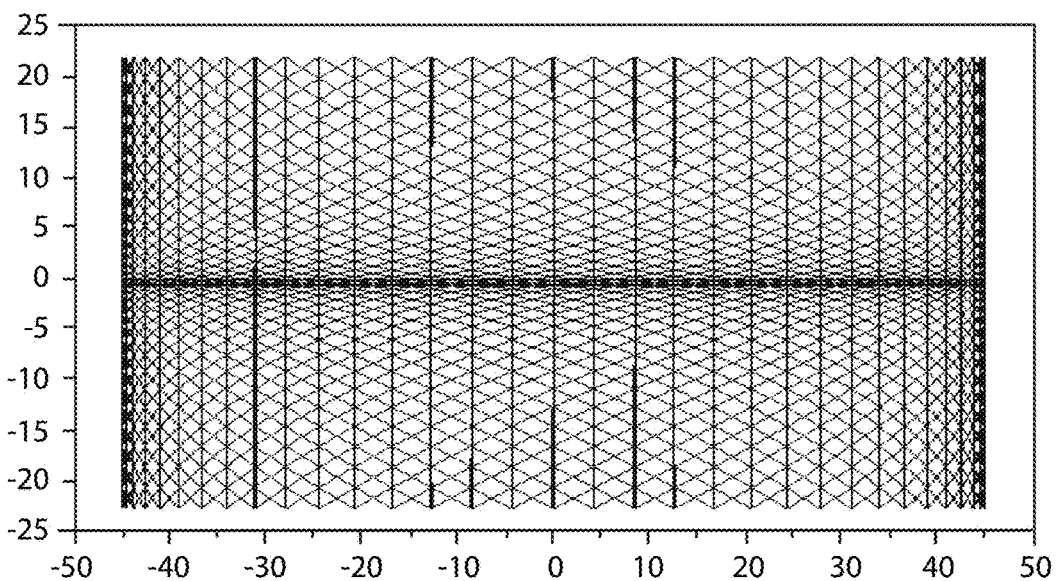
Figure 10B

LADAR TRANSMITTER WITH OPTICAL FIELD SPLITTER/INVERTER FOR IMPROVED GAZE ON SCAN AREA PORTIONS

CROSS-REFERENCE AND PRIORITY CLAIM TO RELATED PATENT APPLICATIONS

This patent application claims priority to U.S. provisional patent application 62/297,126, filed Feb. 18, 2016 and entitled "Improved Ladar Transmitter with Resonant Scan Optical Field Splitter/Inverter", the entire disclosure of which is incorporated herein by reference.

This patent application also claims priority to U.S. provisional patent application 62/439,378, filed Dec. 27, 2016 and entitled "Ladar Transmitter with Improved Gaze on Scan Area Portions", the entire disclosure of which is incorporated herein by reference.

This patent application is related to U.S. patent application Ser. No. 15/431,096, filed this same day and entitled "Ladar Transmitter with Induced Phase Drift for Improved Gaze on Scan Area Portions", the entire disclosure of which is incorporated herein by reference.

INTRODUCTION

It is believed that there are great needs in the art for improved computer vision technology, particularly in an area such as automobile computer vision. However, these needs are not limited to the automobile computer vision market as the desire for improved computer vision technology is ubiquitous across a wide variety of fields, including but not limited to autonomous platform vision (e.g., autonomous vehicles for air, land (including underground), water (including underwater), and space, such as autonomous land-based vehicles, autonomous aerial vehicles, etc.), surveillance (e.g., border security, aerial drone monitoring, etc.), mapping (e.g., mapping of sub-surface tunnels, mapping via aerial drones, etc.), target recognition applications, remote sensing, safety alerting (e.g., for drivers), and the like).

As used herein, the term "ladar" refers to and encompasses any of laser radar, laser detection and ranging, and light detection and ranging ("lidar"). Ladar is a technology widely used in connection with computer vision. Ladar systems share the high resolution and intuitive feel of passive optic sensors with the depth information (ranging) of a radar system. In an exemplary ladar system, a transmitter that includes a laser source transmits a laser output such as a ladar pulse into a nearby environment. Then, a ladar receiver will receive a reflection of this laser output from an object in the nearby environment, and the ladar receiver will process the received reflection to determine a distance to such an object (range information). Based on this range information, a clearer understanding of the environment's geometry can be obtained by a host processor wishing to compute things such as path planning in obstacle avoidance scenarios, way point determination, etc. However, conventional ladar solutions for computer vision problems suffer from high cost, large size, large weight, and large power requirements as well as large data bandwidth use. The best example of this being vehicle autonomy. These complicating factors have largely limited their effective use to costly applications that require only short ranges of vision, narrow fields-of-view and/or slow revisit rates.

For example, ladar systems are known in the art where a ladar transmitter illuminates a large number of range points simultaneously. Flash ladar is an example of such a system. However, these conventional systems are believed to suffer from a number of shortcomings. For example, flash ladar systems require a very high energy per pulse laser, which is not only costly but can also be an eye hazard. Furthermore, the read-out integrated circuits for flash ladar systems are typically quite noisy. Also, the wide field-of-view signal-to-noise ratio (SNR) for flash ladar systems is typically very low, which results in short ranges, thereby detracting from their usefulness.

In an effort to satisfy the needs in the art for improved ladar-based computer vision technology, the inventor has disclosed a number of embodiments for methods and systems that apply scanning ladar transmission concepts in new and innovative ways, as described in U.S. patent application Ser. No. 62/038,065, filed Aug. 15, 2014 and U.S. Pat. App. Pubs. 2016/0047895, 2016/0047896, 2016/0047897, 2016/0047898, 2016/0047899, 2016/0047903, and 2016/0047900, the entire disclosures of each of which are incorporated herein by reference.

The inventor believes that there are needs in the art for further improvements on how scanning ladar transmitters can be designed to optimize their gaze on regions of interest in the environment. While radars have been highly optimized with scheduling methods to dwell (gaze) where gaze is needed when gaze is needed, conventional ladar systems today do not share this dwell optimality. This is because ladar suffer from the very thing that makes them attractive: their resolution.

This is because, while even the world's largest radars have thousands of beam choices upon which to dwell, even a small automotive ladar system fitting in the palm of the hand routinely has 100,000+ or even millions of choices for dwell. This leads to two general design choices for ladar engineers: (i) mechanically step from dwell to dwell, or (ii) use resonant mirrors that rapidly scan through the scene. Design approach (i) is precise and adaptable but is extremely slow in environments where there are large numbers of interrogation cells present. Design approach (ii) has historically been non-adaptable. To improve upon these conventional design approaches, the inventors disclose techniques by which one can reduce the disadvantages of resonant mirror-based ladar while achieving much of the acuity and specificity that historically has only been available to mechanical stepping techniques and without losing the speed advantages of resonant scanning mirrors.

In example embodiments, the inventors disclose designs for a field splitter/inverter that can be used in combination with high speed scans such as Lissajous scans to improve the gaze of a ladar transmitter on desired scan areas (such as a center region of a scan area). The inventors further disclose how an induced periodic phase drift can be incorporated into a Lissajous scan to further improve gaze by reducing scan gaps in desired regions, while doing so in a manner that can ensure low amplitude and zero impact on periodicity, thereby ensuring beam quality and preserving mensuration.

These and other features and advantages of the present invention will be described hereinafter to those having ordinary skill in the art.

BRIEF DESCRIPTION OF THE DRAWINGS

FIG. 9 is a table that exhibits performance results for different use cases of a ladar transmitter.

FIG. 10A depicts an example of a standard Lissajous scan pattern.

FIG. 10B depicts an example of a split/inverted Lissajous scan pattern.

DETAILED DESCRIPTION OF EXAMPLE EMBODIMENTS

Figure 1A:
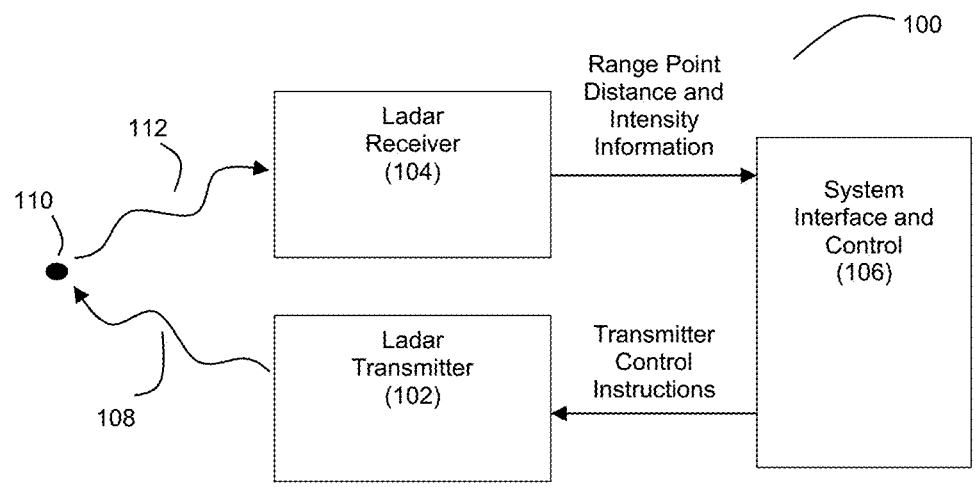
FIGS. 1A and B illustrate example embodiments of ladar transmitter/receiver systems.

FIG. 1A illustrates an example embodiment of a ladar transmitter/receiver system 100. The system 100 includes a ladar transmitter 102 and a ladar receiver 104, each in communication with system interface and control 106. The ladar transmitter 102 is configured to transmit a plurality of ladar pulses 108 toward a plurality of range points 110 (for ease of illustration, a single such range point 108 is shown in FIG. 1A). Ladar receiver 104 receives a reflection 112 of this ladar pulse from the range point 110. Ladar receiver 104 is configured to receive and process the reflected ladar pulse 112 to support a determination of range point distance [depth] and intensity information. In addition the receiver 104 determines spatial position information [in horizontal and vertical orientation relative to the transmission plane] by any combination of (i) prior knowledge of transmit pulse timing, and (ii) multiple detectors to determine arrival angles.

Figure 1B:
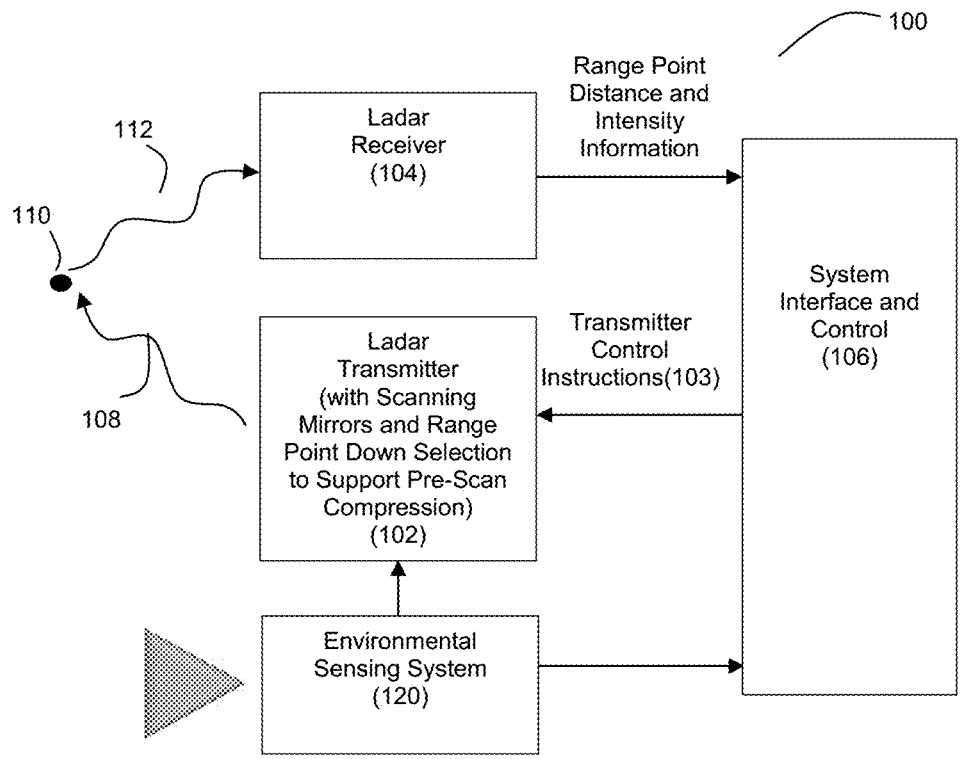

In example embodiments, the ladar transmitter 102 can take the form of a ladar transmitter that includes scanning mirrors. Furthermore, in an example embodiment, the ladar transmitter 102 uses a range point down selection algorithm to support pre-scan compression (which can be referred herein to as "compressive sensing"), as shown by FIG. 1B. Such an embodiment may also include an environmental sensing system 120 that provides environmental scene data to the ladar transmitter 102 to support the range point down selection. Specifically, the control instructions will instruct a laser source when to fire, and will instruct the transmitter mirrors where to point. Example embodiments of such ladar transmitter designs can be found in U.S. patent application Ser. No. 62/038,065, filed Aug. 15, 2014 and U.S. Pat. App. Pubs. 2016/0047895, 2016/0047896, 2016/0047897, 2016/0047898, 2016/0047899, 2016/0047903, and 2016/0047900, the entire disclosures of each of which are incorporated herein by reference. Through the use of pre-scan compression, such a ladar transmitter can better manage bandwidth through intelligent range point target selection. An example embodiment of ladar receiver 104 can be found in U.S. patent application Ser. No. 62/297,126, filed Feb. 18, 2016. While these referenced and incorporated patent applications describe example embodiments for the ladar transmitter 102 and ladar receiver 104, it should be understood that practitioners may choose to implement the ladar transmitter 102 and/or ladar receiver 104 differently than as disclosed in these referenced and incorporated patent applications.

Figure 2A:
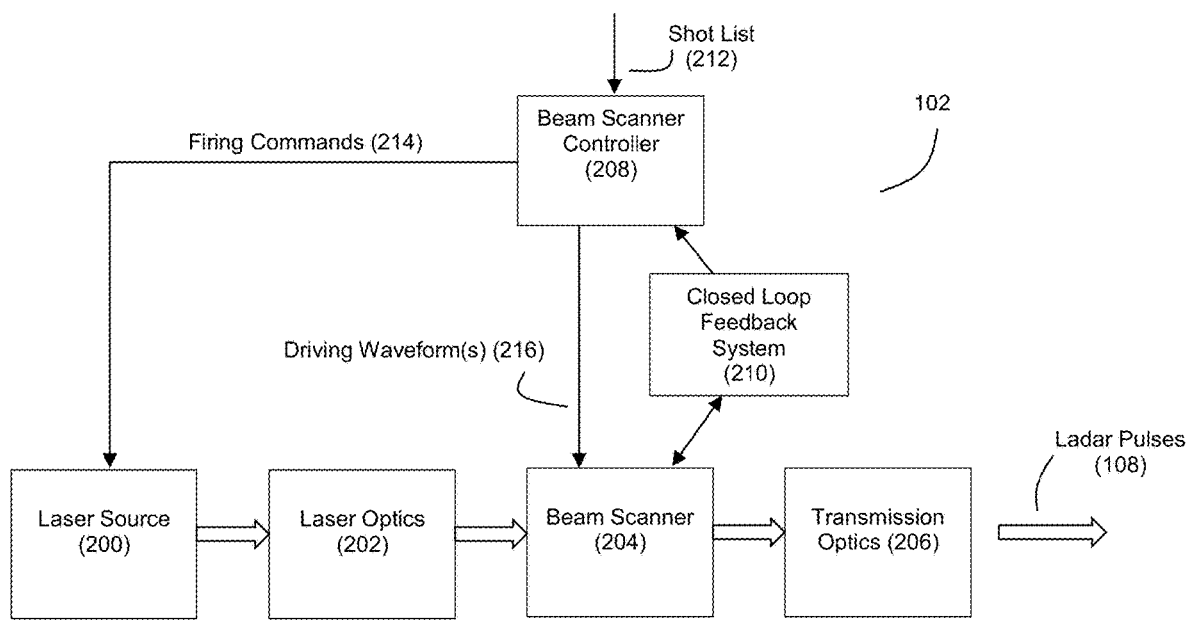
FIG. 2A depicts an example embodiment of a ladar transmitter.

FIG. 2A depicts an example embodiment for a ladar transmitter 104 as disclosed by the above-referenced and incorporated patent applications. The ladar transmitter 104 can include a laser source 200 in optical alignment with laser optics 202, a beam scanner 204, and transmission optics 206. These components can be housed in a packaging that provides a suitable shape footprint for use in a desired application. For example, for embodiments where the laser source 200 is a fiber laser or fiber-coupled laser, the laser optics 202, the beam scanner 204, and any receiver components can be housed together in a first packaging that does not include the laser source 200. The laser source 200 can be housed in a second packaging, and a fiber can be used to connect the first packaging with the second packaging. Such an arrangement permits the first packaging to be smaller and more compact due to the absence of the laser source 200. Moreover, because the laser source 200 can be positioned remotely from the first packaging via the fiber connection, such an arrangement provides a practitioner with greater flexibility regarding the footprint of the system.

Based on the control information transmitter control instructions, such as a shot list 212 generated by system control 106, a beam scanner controller 208 can be configured to control the nature of scanning performed by the beam scanner 204 as well as control the firing of the laser source 200. A closed loop feedback system 210 can be employed with respect to the beam scanner 204 and the beam scanner controller 208 so that the scan position of the beam scanner 204 can be finely controlled, as explained in the above-referenced and incorporated patent applications.

The laser source 200 can be any of a number of laser types suitable for ladar pulse transmissions as described herein.

For example, the laser source 200 can be a pulsed fiber laser. The pulsed fiber laser can employ pulse durations of around 1-4 ns, and energy content of around 0.1-100 µJ/pulse. The repetition rate for the pulsed laser fiber can be in the kHz range (e.g., around 1-500 kHz). Furthermore, the pulsed fiber laser can employ single pulse schemes and/or multi-pulse schemes as described in the above-referenced and incorporated patent applications. However, it should be understood that other values for these laser characteristics could be used. For example, lower or higher energy pulses might be employed. As another example, the repetition rate could be higher, such as in the 10's of MHz range (although it is expected that such a high repetition rate would require the use of a relatively expensive laser source under current market pricing).

As another example, the laser source 200 can be a pulsed IR diode laser (with or without fiber coupling). The pulsed IR diode laser can employ pulse durations of around 1-4 ns, and energy content of around 0.01-10 µJ/pulse. The repetition rate for the pulsed IR diode fiber can be in the kHz or MHz range (e.g., around 1 kHz-5 MHz). Furthermore, the pulsed IR diode laser can employ single pulse schemes and/or multi-pulse schemes as described in the above-referenced and incorporated patent applications.

The laser optics 202 can include a telescope that functions to collimate the laser beam produced by the laser source 200. Laser optics can be configured to provide a desired beam divergence and beam quality. As example, diode to mirror coupling optics, diode to fiber coupling optics, and fiber to mirror coupling optics can be employed depending upon the desires of a practitioner.

The beam scanner 204 is the component that provides the ladar transmitter 104 with scanning capabilities such that desired range points can be targeted with ladar pulses. The beam scanner receives an incoming ladar pulse from the laser source 200 (by way of laser optics 202) and directs this ladar pulse to a desired downrange location (such as a range point on the shot list) via reflections from movable mirrors. Mirror movement can be controlled by one or more driving voltage waveforms 216 received from the beam scanner controller 208. Any of a number of configurations can be employed by the beam scanner 204. For example, the beam scanner can include dual microelectromechanical systems (MEMS) mirrors, a MEMS mirror in combination with a spinning polygon mirror, or other arrangements. An example of suitable MEMS mirrors are single surface tip/tilt/piston MEMS mirrors. By way of further example, in an example dual MEMS mirror embodiment, a single surface tip MEMS mirror and a single surface tilt MEMS mirror can be used. However, it should be understood that arrays of these MEMS mirrors could also be employed. Also, the dual MEMS mirrors can be operated at any of a number of frequencies, examples of which are described in the above-referenced and incorporated patent applications, with additional examples being discussed below. As another example of other arrangements, a miniature galvanometer mirror can be used as a fast-axis scanning mirror. As another example, an acousto-optic deflector mirror can be used as a slow-axis scanning mirror. Furthermore, for an example embodiment that employs the spiral dynamic scan pattern discussed below, the mirrors can be resonating galvanometer mirrors. Such alternative mirrors can be obtained from any of a number of sources such as Electro-Optical Products Corporation of New York. As another example, a photonic beam steering device such as one available from Vescent Photonics of Colorado can be used as a slow-axis scanning mirror. As still another example, a phased array device such as the one being developed by the DARPA SWEEPER program could be used in place of the fast axis and/or slow axis mirrors.

Also, in an example embodiment where the beam scanner 204 includes dual mirrors, the beam scanner 204 may include relay imaging optics between the first and second mirrors, which would permit that two small fast axis mirrors be used (e.g., two small fast mirrors as opposed to one small fast mirror and one long slower mirror).

The transmission optics 206 are configured to transmit the ladar pulse as targeted by the beam scanner 204 to a desired location through an aperture. The transmission optics can have any of a number of configurations depending upon the desires of a practitioner. For example, the environmental sensing system 106 and the transmitter 104 can be combined optically into one path using a dichroic beam splitter as part of the transmission optics 206. As another example, the transmission optics can include magnification optics as described in the above-referenced and incorporated patent applications or descoping [e.g., wide angle] optics. Further still, an alignment pickoff beam splitter can be included as part of the transmission optics 206.

Field Splitting and Inversion to Optimize the Ladar Transmitter's Gaze on Desirable Regions within the Scan Area:

The beam scanner controller 208 can provide voltage waveforms 214 to the beam scanner 204 that will drive the mirrors of the beam scanner to a desired scan position pairing (e.g., scan angles). The voltage waveforms 214 will define a scan pattern for the targeting of the ladar transmitter 102 within a scan area. The firing commands 214 generated by the beam scanner controller 208 can be coordinated with the scan pattern so that the ladar transmitter 102 fires ladar pulses toward desired range points within the scan area. Example embodiments for the beam scanner controller 208 are described in the above-referenced and incorporated patent applications.

Figure 2B:
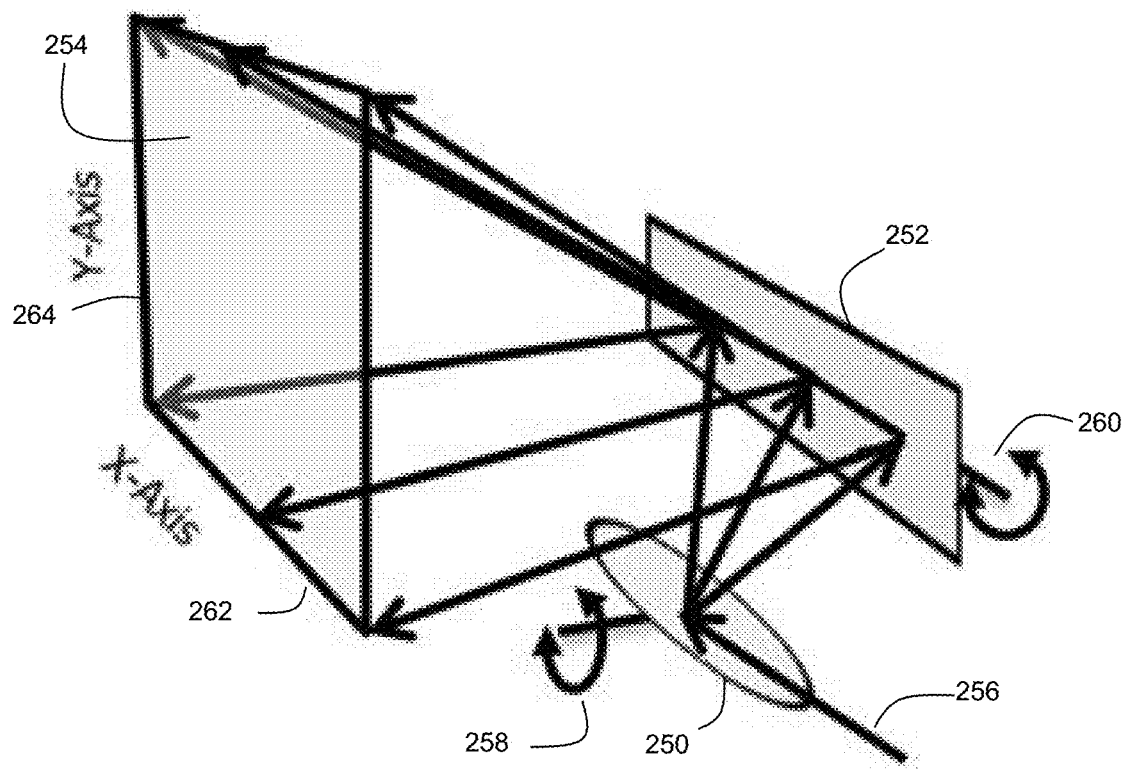
FIG. 2B shows a scan area defined by two scanable mirrors for an example scanning ladar transmitter.

FIG. 2B shows an example beam scanner arrangement where the positioning of mirrors 250 and 252 about rotational axes 258 and 260 respectively defines the targeting for the beam scanner within a scan area 254. An incoming incident ladar pulse launched from laser source 200, coming from direction 256, will impact scanning mirror 250, whereupon it is reflected toward scanning mirror 252, whereupon it is reflected toward a range point within the scan area 254. The positioning of the scanning mirrors 250 and 252 will control which horizontal and vertical positions within the scan area 254 are targeted, and the range [depth] for these positions will then be extracted from pulse compression processing within the receiver.

Figure 2C:
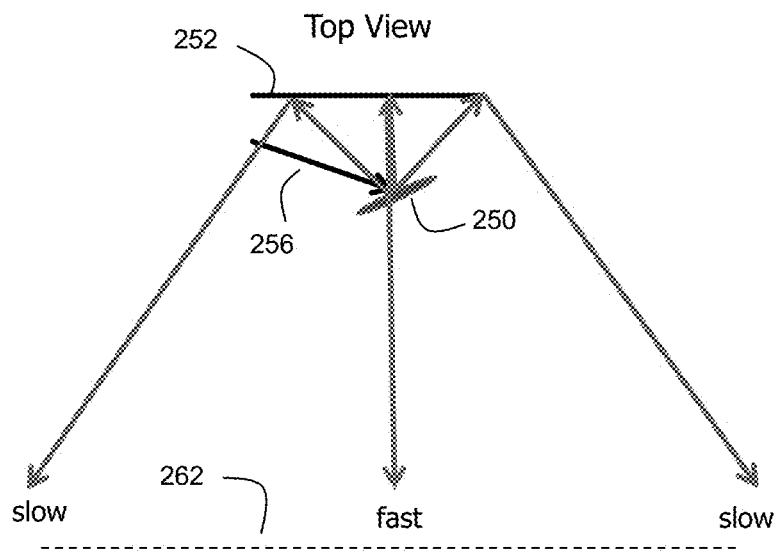
FIG. 2C shows a top view of the scan arrangement defined by FIG. 2B.

In an example embodiment, mirror 250 can control where the beam scanner is targeted along a first-axis 262 of the scan area 254, and mirror 252 can control where the beam scanner is targeted along a second axis 264 of the scan area 104. The first and second axes may be orthogonal to each other (e.g., a horizontal X-axis and a vertical Y-axis). Note that the second mirror, 252, is shown in this embodiment to be larger than the first mirror 250. This is because of the sweep in angles arising as the first mirror scans, three such positions are shown in the figure. It is desirable for compaction to introduce relay imaging optics between 250 and 252 which reduces the size of the second mirror. When one or both mirrors are scanning at a resonant frequency, the speed of the scan will be fast in the middle of the scan area and slower at the edges of the scan area. This characteristic is shown by FIG. 2C, which provides a top view of the beam scanner arrangement. In the view of FIG. 2C, as mirror 250 scans at resonance, the targeting of the beam scanner along the X-axis 262 of the scan area 254 will be faster in the middle of the scan area than it is on the edges. The same would hold true with respect to the Y-axis 264 of the scan area 254 (where the targeting will move faster in the middle of the scan area that is does on the edges). This high rate of speed in the middle of the scan area may pose efficiency problems when a practitioner wants to implement a scan pattern that includes a large number of range points within the middle of the scan area and/or includes interline skips/detours in the middle of the scan area. A description of interline skips and detours in connection with ladar transmitters can be found in the above-referenced and incorporated patent applications. This "fast in the middle" scan characteristic be particularly acute when both mirrors are scanned at resonance so as to achieve a Lissajous scan pattern (example embodiments of which are discussed below). Lissajous scan patterns allow for the mirrors to be scanned at high rates, and thus provides a fast moving scan pattern. However, with a "fast in the middle" scan characteristic, of which a Lissajous scan pattern is a prime example, the ladar transmitter may not have enough time to fire ladar pulses at all of the range points within the middle of the scan area without at least increasing the laser firing rate (which may decrease pulse energy) or including additional line repeats in the scan pattern.

In an effort to solve this problem, the inventor discloses the use of an optical field splitter/inverter (hereinafter "field inverter") that is positioned optically downstream from the mirrors 250 and 252 and positioned to receive and re-direct ladar pulses that are outgoing from the mirrors so that the scan area is split and inverted in a manner that causes the fast portion of the scan to reside at the edges of the scan area and the slower portion of the scan to reside in the middle of the scan area.

Figure 3:
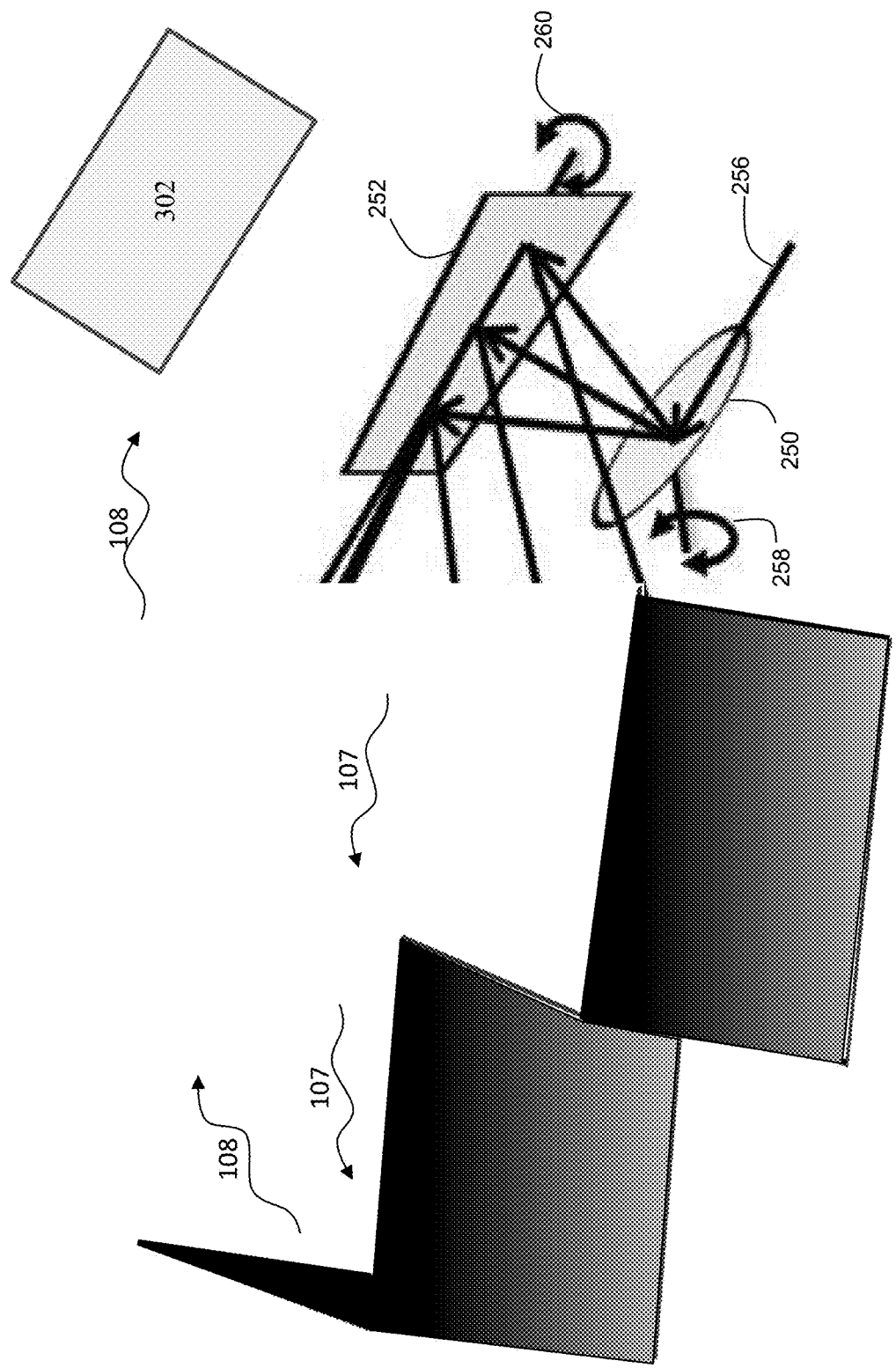
FIG. 3 shows a beam scanner that includes a field splitter/inverter in accordance with an example embodiment.

FIG. 3 shows an example embodiment where the beam scanner for a scanning ladar transmitter includes a field splitter/inverter 300 that is positioned optically downstream from mirrors 250 and 252 to split and invert the scan area relative to the scan area 254 of FIG. 2B.

For the purpose of brief explanation, in this example, the beam scanner includes mirrors 250 and 252 that may take the form of dual MEMS mirrors. However, it should be understood that other mirrors could be used for the first and/or second mirrors (e.g., galvo-meter mirrors). First mirror 250 is positioned to receive an incident ladar pulse. Mirror 250 will reflect this ladar pulse to the second scanning mirror 252. It should be understood that this reflection can be a direct reflection or an indirect reflection whereby the beam reflected from mirror 250 passes through relay imaging optics such as a unity magnification telescope on its way to mirror 252. Mirror 252 is positioned to receive the reflected laser pulse from mirror 250 and further reflect this laser pulse onto the field inverter mirror 300. The reflection off this mirror can then passed through a telescope/descope to produce the outgoing laser pulse 108 which then travels to a designated horizontal/vertical location within a scan area 302 corresponding to the range point a shot list that is being targeted by the beam scanner.

The first and second mirrors 250 and 252 are controllably rotatable around their respective axes of rotation 258 and 260 as discussed above. Thus, mirror 250 will be rotatable to control the position of the ladar pulse within the scan area 302 along the scan area's X-axis, while mirror 252 will be rotatable to control the position of the ladar pulse within the scan area 302 along the scan area's Y-axis. Thus, the combined positioning of mirrors 250 and 252 along their respective axes of rotation when the ladar pulse strikes each mirror will be effective to direct the launched ladar pulse 108 to the desired location within the scan area 302. In an example embodiment, the X-axis mirror 250 is scanned at resonance. However, it should be understood that the Y-axis mirror 252 could also be scanned at resonance. Further still, any combination of mirrors 250 and 252 could be scanned at resonance.

It should also be understood that one of the axes can serve as a "fast axis" and the other axis serving as a "slow axis" to reflect the relative scan rates of mirrors 250 and 252. For example, the X-axis can serve as the fast axis, and the Y-axis could serve as the slow axis. It should be understood by a practitioner that the designation of the fast axis as the X-axis and the slow axis as the Y-axis is arbitrary as a 90 degree turn in position for the system would render the X-axis as the slow axis and the Y-axis as the fast axis. Furthermore, in an example embodiment, the fast axis mirror is smaller than the slow axis mirror in terms of mirror area and is also positioned upstream from the slow axis mirror (that is, the fast axis mirror receives the ladar pulse and reflects it to the slow axis mirror for transmission toward the targeted range point). However, this configuration could be changed for other embodiments. For example, while making the slow axis mirror larger than the fast axis mirror provides a benefit in terms of permitting a larger scan area, for embodiments where a decrease in the size of the scan area is permissible, the slow axis mirror could be the same size or even smaller than the fast axis mirror. As another example, if the fast axis mirror were downstream from the slow axis mirror, re-imaging optics, such as relay imaging optics, could be used between the two mirrors to support such an arrangement.

FIG. 3 shows an embodiment where an optical field splitter/inverter 300 is positioned to receive and redirect the ladar pulse reflected by mirror 252. Thus, the field splitter/inverter 300 is optically downstream from mirrors 250 and 252. The field splitter/inverter 300 may comprise mirrors or lenses that are arranged to both split the field of view for the transmitter and invert the split field of view. Note the figure assumes a mirror/reflector is used so the imaged scene 302 is behind the MEMs assembly to the far right.

Figure 4:
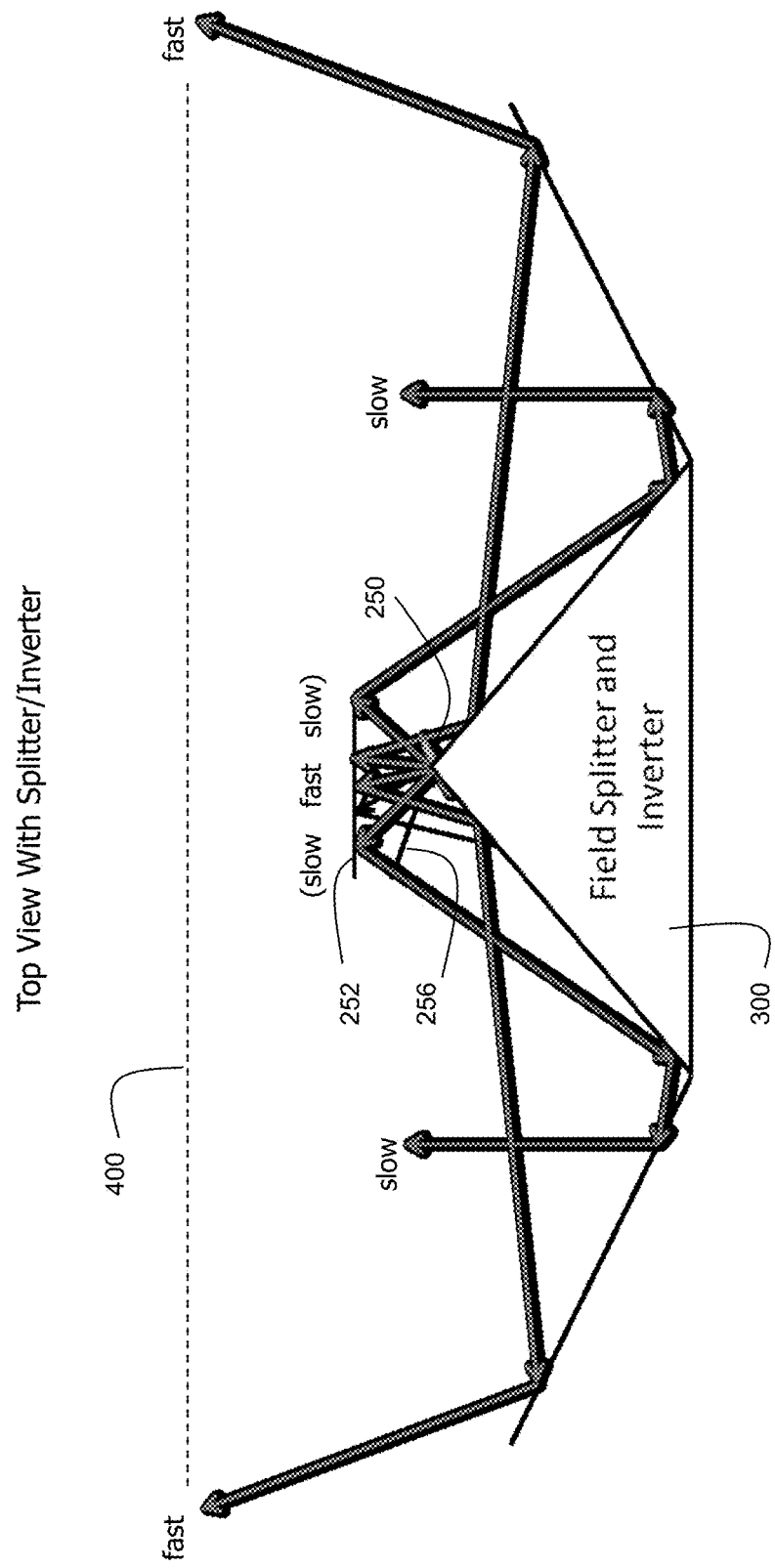
FIG. 4 shows a top view of the beam scanner arrangement defined by FIG. 3.

In an example embodiment, the field inverter 300 may take the form of reflectors arranged in a W-shape as shown by FIG. 3 (see also FIG. 4, which is a top view of the FIG. 3 arrangement). Here, the laser pulse launched from the second mirror, 107, is inverted and passed along to the scene to be imaged, 302, in speed inverted fashion. The launched pulse 108 will now be slowly scanning where 107 is fast (and vice versa).

FIG. 4 is a top view of the beam scanner arrangement of FIG. 3, and it shows the effect of the field inverter 300 on the resultant field of view/scan area. As explained above, unlike the FIG. 1 embodiment (where the beam scanner scans through the scan area in a manner that is faster in the middle and slower at the edges while mirror 250 scans at resonance (as reflected in the parenthetical shown by FIG. 4 above mirror 102)), the beam scanner for the embodiments of FIGS. 3 and 4 scans through the scan area in manner that is slower in the middle and faster at the edges due to the field inverter 300. The beam ray path for the beam scanner of FIGS. 3 and 4 is shown via the arrows in FIG. 4, and it can be seen that the beams which would otherwise have landed in the middle of the scan area are instead redirected to the edge of the scan area 400, the top view of 302, via the field inverter.

Figure 5:
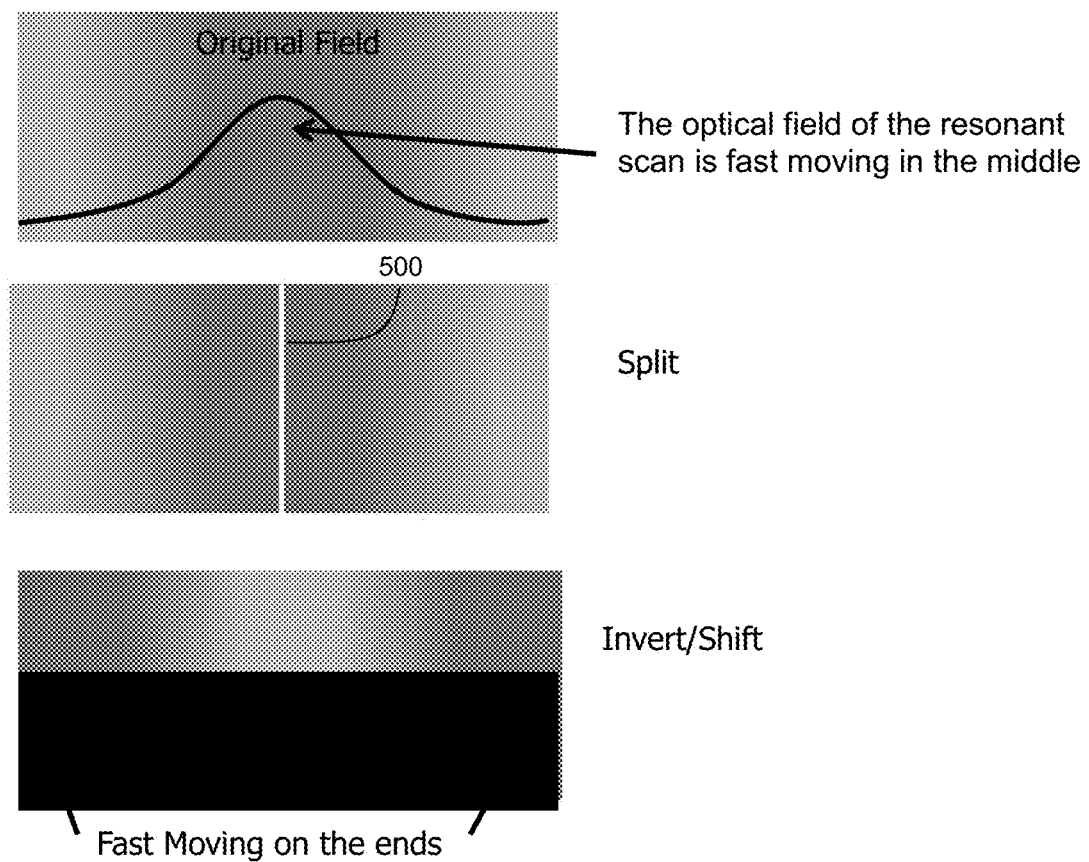
FIG. 5 shows how the field splitter/inverter operates to split and invert the scan pattern of the mirrors across the scan area.

FIG. 5 illustrates the effect of the field inverter 300 on the beam field. The top frame of FIG. 5 shows a plot of the scan speed across the field when mirror 250 is scanning at resonance. As can be seen, the scan speed is faster in the middle of the field than it is at the edges. The field inverter 300 provides a splitting effect and an inverting effect. The middle frame of FIG. 5 shows the split effect at line 500, where the field is split into two halves. The bottom frame of FIG. 5 shows the inversion effect that operates on each of the split fields (where each half defined by line 500 is inverted). For the example embodiment of FIGS. 3 and 4, the split line 500 corresponds to the central peak of the W-shape of the field inverter. The field inverter 300 can be optically positioned so that this central peak corresponding to split line 500 falls within the middle of the field of view. Due to the field inverter 300, the beam scan path within each split field is inverted. This yields the plot of scan speed across the field as shown by the bottom frame of FIG. 5. As can be seen, the scan speed now becomes faster at the edges than it is in the middle of the field. This scan characteristic provides the ladar transmitter with more time to accommodate groupings of range points in the middle of a frame. Furthermore, when paired with a ladar transmitter that employs a shot list and dynamic scan pattern that includes interline skipping and/or detouring, this scan characteristic also provides the ladar transmitter with more time to accommodate the line skips and/or line detours that may occur in the middle of the frame.

It should be understood that a shot list employed by the ladar transmitter would employ a re-mapping of range points on the shot list to accommodate the split and inverted field of view.

Figure 6A:
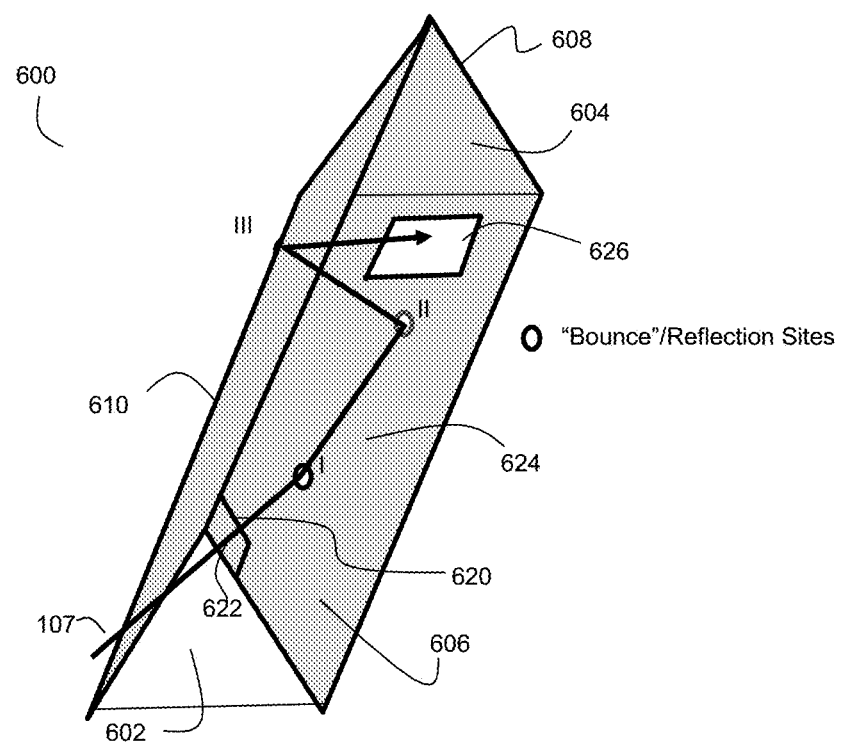
FIG. 6A shows a perspective view of a field splitter/inverter in accordance with another example embodiment.

In another example embodiment, the field inverter 300 may take the form a triangular prism 600 as shown by FIG. 6A. The triangular prism 600 can define an inverted V-shape for reflection of light pulses as discussed below. The example triangular prism of FIG. 6 is shown in perspective view and exhibits a shape that includes first triangular face 602 and second triangular face 604 at opposite ends of the prism 600. First, second, and third sides 606, 608, and 610 serve as the underside, right side, and left side respectively of the triangular prism 600 shown by FIG. 6, and these sides connect the triangular faces 602 and 604. In the example of FIG. 6A, the triangular faces 602 and 604 are oriented perpendicularly with respect to sides 606, 608, and 610, although this need not be the case. Triangular prism 600 can be formed from any material transparent to the incident laser wavelength with the active regions where bounce paths may occur treated with reflective material. Since empty space (air or vacuum) is transparent to ladar laser light, the prism can be hollow or dense whichever any desired manufacturing dictates.

Figure 6B:
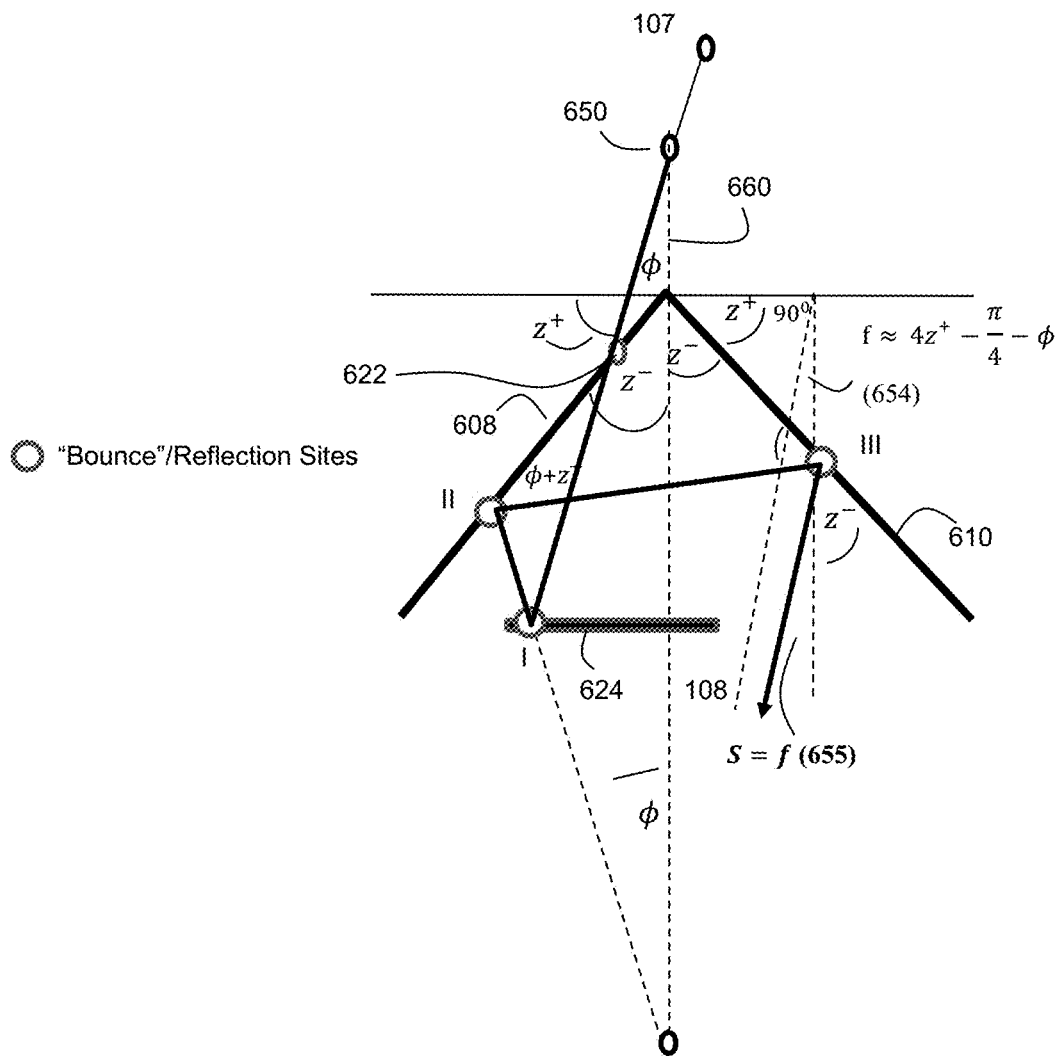
FIGS. 6B and 6C show additional views of the field splitter/inverter of FIG. 6A.
Figure 6C:
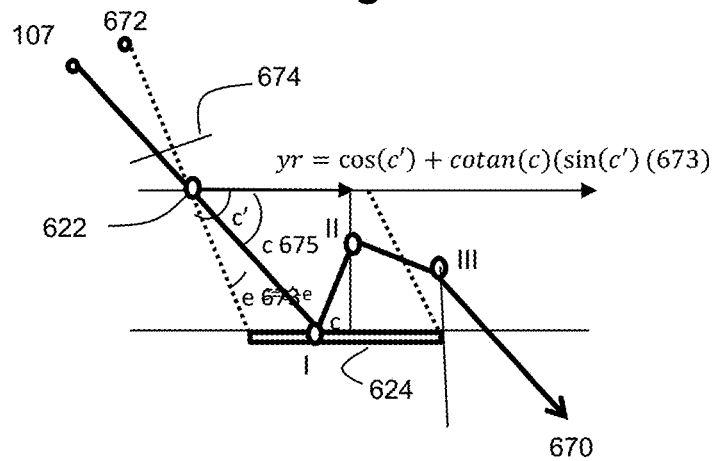

The view of FIG. 6A is from a perspective above a laser feed 107, with partially transparent mirrors to permit visualization of the prism interior. FIG. 6B provides a vertical cut view into the triangular prism 600 of FIG. 6A, and FIG. 6C provides a depth cut view into the triangular prism 600 of FIG. 6A. In this example, we can take the horizontal direction (azimuth) to be a fast axis scan which we seek to invert, and elevation can be step-scanned or resonant-scanned. The architecture of prism 600 shown by FIG. 6 is invariant to this choice.

With reference to FIG. 6A, a laser pulse 107 enters the prism 600 through injection region 620. The precise site of entry 622 will vary as a result of the scanning by mirrors to define a scan pattern over a scan area. Accordingly, injection region 620 is shown in FIG. 6A as a box area to indicate such range of potential entry points. After entry into the prism 600, the pulse 107 will travel linearly until it strikes a reflector mirror 624 on an interior portion of underside 606, where reflector mirror 624 is offset in depth within prism 600. The bullet points in FIG. 6A show sites of reflection (or "bounce") within the prism 600 where the pulse transiting through 600 is reflected in a new direction. Each bounce site is labeled as I, II, or III based on an order of bounces for the pulse 107. Thus, after striking reflector mirror 624, the pulse strikes a reflector mirror on an interior portion of right side 608 (bounce site II), whereupon the pulse 107 is re-directed to strike a reflector mirror on an interior portion of left side 610 (bounce site III).

The laser injection angle at injection site 622 can be obliquely selected part way from vertical to horizontal. This allows the pulse 107 to bounce against both right mirror 608 (bounce site II) and left mirror 610 (bounce site III) and finally to exit the prism 600 through exit cut 626 and on to an exterior lens 670 (see FIG. 6C; e.g., an up/down scope) without encountering occlusions. We denote the side pitch angle for mirror 608 as z+. With reference to FIG. 6B, the azimuth scan of the scanning mirrors 250 and 252 is mapped through bounce sites I-III to the angle f, 654, formed between the two dotted lines at the right hand side of the figure. The far field angle S, 655, is formed from the angles between the vertical dotted line at the right and the "flight trajectory" of the pulse 108 exiting the field inversion assembly. Behold from congruence arguments that S=f. As in the W embodiment of FIGS. 3 and 4, the pulse 108 is fast when 107 is slow and vice versa since the angles are reciprocally related. Our goal, if we wish to avoid a gap, 500, is to set S so that the leftmost angle we can scan to is vertical i.e. S(min)=0. This ensures that the scan angle starts vertical and moves right; if it starts anywhere else the slit 500 will be large, otherwise it is negligibly small, and limited to creeping waves. Algebra reveals that $$f = S \approx 4z^+ - \frac{\pi}{4} - \phi.$$

(see 654 text). When the scanning mirror azimuth scan is set to φ=0 [where the trajectory of 107 is fastest], we see that the launched pulse 108 is sent to $$4z^+ - \frac{\pi}{4}.$$

Likewise when the scan is at its maximum angle $\phi_{\{max\}}$ we obtain $$S = f = s \approx 4z^+ - \frac{\pi}{4} - \phi_{\{max\}}.$$

So we obtain $$\phi_{\{max\}} = 4z^+ - \frac{\pi}{4}.$$

as the desired mirror pitch angle. This completes the field inversion prism shape's exterior 602-610 as it relates to pre-inversion scan angle and scene azimuth positioning. It remains to discuss the prism internal structure and elevation scan.

Referring to FIG. 6C, it can be shown by algebra that the choice of injection angle c [the vertical angle for the scanning mirror output pulse 107], 675, will produce a desired far field elevation scan angle of this exact same value, that is c, 675, equals the depression angle of the ray 670. As the injection elevation angle c varies from c' to c, it sweeps through angle e, 673, the elevation swath of the scanning mirror. The bounce point I in FIG. 6C will then move along the prism base 674. It should be clear that the length of this sweep determines the extent to which the mirror interior must be treated with a reflective surface. The entire prism apparatus can be scaled by an overall scale factor to account for the projective geometry. Specifically the pulse launch from the prism will travel along the vector t sin(c)[sin(4z–φ), cos(4z–φ), cot(c)]. We can see that we can treat the x,h analysis as a two dimensional problem and afterwards correct by a scale factor of sin(c). This observation is in fact what enabled us to decompose the problem into x,h then y,h in the first place, as done previously.

Also shown in FIG. 6B is a dotted line 660 traversing the injection site 622 at the horizontal axis of symmetry This dotted line 660 is not traveled by the laser, but is a virtual path that is able to replace the actual path for the first bounce site I in modeling. The virtue of so doing is the geometric mathematics then greatly simplifies. One can observe that the laser pulse 107 arriving from the scanning mirror will come from different locations by virtue of the different points on mirror 252 that are illuminated. The fact that 107 moves about complicates the math, and it is much easier to invoke symmetry and "pretend" the laser pulse originates from point 650 with different arrival angles.

We can now introduce some notation. We can denote the horizontal direction as x, the elevation as h (height), and the depth of the prism, i.e. the distance along the line connecting 602 and 604, as y. With this notation, FIG. 6A shows the prism 600 with sides 602, 604 in the x,h plane and the underside lies in the x,y plane. Next, we introduce subscripts l,r to denote the left and right side mirrors 610 and 608 respectively. This means that the mirror pitch angle can be represented as z where $$z^{\pm} \equiv \frac{\pi}{4} \pm z.$$

This notation simplifies a mathematical representation of prism 600. Recall, the pitch angle of the V shape is $z^+$, and the internal angle inside the V shape (which is the angular complement of $z^+$) is $z^-$. The field inversion is defined via the mathematical dance which the laser angles undergo as the follow through these angles. Recall, the notation f, 654, denotes the scan angle in the horizontal direction that we desire in the far field, which also happens to equal S, 655. The notation c' denotes the steepest downward injection angle (when the pulse 107 travels path 672) used in the elevation scan (as measured from the vertical axis on FIG. 6A). Recall that the notation c is the tunable far field elevation angle, ranging from zero to e, 673 (see FIG. 6C), as measured against the horizontal plane (see the horizontal axis in FIG. 6C). We introduced the notation is φ, the azimuth scan angle at a point in time that the second scanning mirror 252 output pulse furnishes at the laser injection site 622. Recall it can be seen that the far field angle f can be expressed as f≈4z–φ. By symmetry, the same behavior will arise if we begin scanning right versus left, with left and right defined as shown in FIG. 6B. Since φ has been inverted, the prism 600 achieves splitting and inversion.

Furthermore, to demonstrate that the prism 600 can be blockage-free, we can lift the scaling. FIG. 6C shows a depth formula for yr as an intermediate to calculate input/output invariance, 673. This formula can be used to position an exterior descope/telescope lens 670 beyond the last bounce III as measured in depth.

If desired by a practitioner, a position sensor (not shown; e.g., a 4 quad position sensor) can be positioned near the second scanning mirror 252 to precisely determine the scan position of mirror 252, which allows for calibrating out material defects beyond the above formula for f. This calibration can be achieved by adding a secondary wavelength into the pulse 108 and placement of a frequency/wavelength-selective mirror (e.g., a dichroic mirror 674) near the injection site 622. This mirror can selectively reflect light at the secondary wavelength to the position sensor for accurate detection of the scan position for mirror 252 over time. A dichroic mirror can also be used to calibrate the scanning of mirror 250 if desired by a practitioner.

Also, Taylor series applied to the far field angle S will reveal that for all practical purposes:

$$\delta f = -\delta \phi - \delta \frac{\phi^3}{2}.$$

This formula can be used to construct the morphing of the far field pattern, i.e. obtaining a desired corrected angle S by adjusting the scanning of mirror 252 and mirror pitch angle z+. Any corrections beyond this point can be masked by calibrating out imperfections in the optical assembly for most and perhaps any diffraction-limited commercial systems. As noted above, such calibration can be achieved by the dichroic mirror 674. By correcting time warping analytically, the range and sophistication of the time warping calibration that relates sinusoidal scan mirror control signals to the scan position in the far field can be greatly simplified.

Also, it should be understood that the right and left mirrors 608 and 610 can be selected to be one-way in their entirety or over injection region 620 to allow the injection region 620 to also be a potential bounce site. This repurposing of the same physical mirror real estate can lead to a more compact design, thereby saving cost, weight, and size for a practitioner. As a minimum for an example embodiment, we can require that the segment of the prism sidetraced by the bottom of the V to point 622 in FIG. 6B must by two-way, as must be the mirror image on the other side of the V. The reason for this is that as φ gets near zero, we want a bounce back when moving from plate 624 towards 660, while we also want an absence of a bounce at the bottom of the V when moving in the opposite direction.

Figure 7:
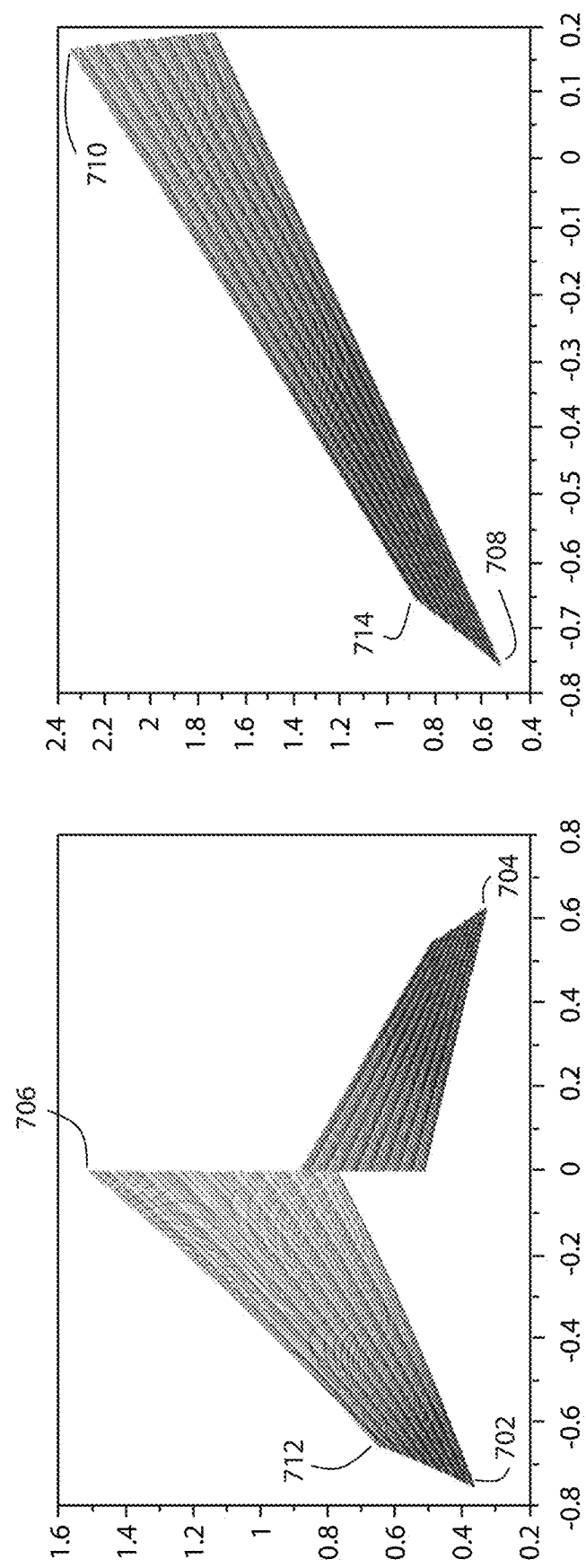
FIG. 7 shows an example ray tracing with respect to beam paths in the field splitter/inverter of FIGS. 6A-C.

Furthermore, ray tracing can be used to determine which regions of the prism interior might serve as bounce sites for laser pulses 108 during operation. The left half of FIG. 7 shows the xl,yl (left side of plot) and xr,yr (right side of plot) ray tracing and region lased in the exit window 626 across the scan volume, shown in mm, for a 1 mm inter scanning mirror spacing and a V slot base to reflector dimension of 1 mm. The x-axis of 702 can be used to select the L-R mirror x-axis (610, 608) onset and the 704 x-axis as the mirrors 610, 608 y-axis onset. The y-axis of 706 can be used as the terminus in depth. As shown in the right half of FIG. 7, we can use the x,y position of 708 to be the beginning (inner terminus) of the exit window 626 and we can use the x,y position of 710 as the end (outer terminus) of the exit window 626. We use the exit window embodiment here to be constant height so the bottom of the prism 606 is coplanar with exit window 626, which is directly attached to an up/downscope. However, it should be noted, canted interfaces with the up-scope may be chosen as compaction might require, and the ray tracing can still be employed to determine requirements on prism dimensions and one-way mirror minimum areas. Thus far, we have defined the rectangular boundaries of mirrors 610/608/606. The portion of the mirror cavity that never receives bounces I, II, or III can now be eliminated. This can be accomplished by computing the contours traced out by 702, 712, 706 and 704, 710, 714 and assigning mirror (i.e., reflective coating) to the attendant convex hull varying over all sets of angles. The mirror need only be one-way over the region determined by ray tracing x,r of the scanning mirror output over their scan angles. Through this process, mirror compaction can be achieved which may reduce manufacturing and raw material costs.

Overlapped Inversion/Splitting:

The field inverter 300 can also be configured to provide an inverted/split field of view that is overlapped. This configuration not only decouples mirror inversion with field look direction but also allows multiple mirror inversions per field look direction within a single axis scan. This overlapping effect allows for a longer gaze along a desired region such as a middle region or centerline of a field of view. Accordingly, it should be understood that the field inverter 300 need not split the field of view into two non-overlapping fields. To achieve overlapping, the mirror pitch angle z+ can be modified so that the launch angle of pulse 108, i.e. angle S swings negative (i.e. left of vertical) at extremal values of the scan angle ϕ.

By creating an overlap, we exchange high elevation scan time for double revisit of the specified foviation zone, which allows a deeper look down that can be useful for avoiding near obstacles.

Figure 8:
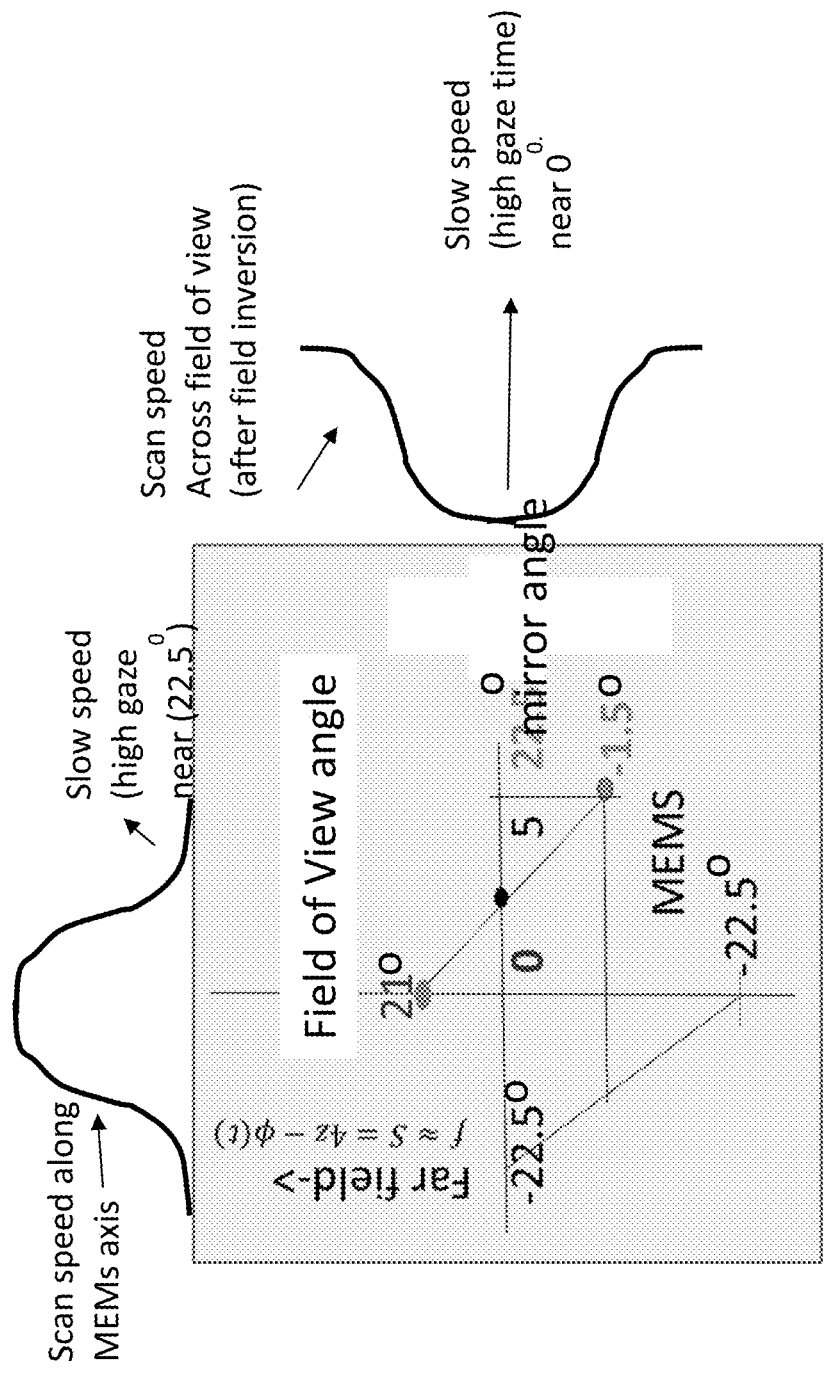
FIG. 8 shows an example of how a split/inverted scan area can be overlapped.

An example of this arrangement is shown by FIG. 8. In this example, we choose to field invert the scan on azimuth (the horizontal axis), with a selected scan volume of 45 degrees, $$A_{az} = \frac{\pi}{4}.$$

Without field inversion, the relation between the x-axis, the resonant scan angle for mirror 252, and the vertical axis, the far field scan angle f would be identical—i.e., =$A_{az}$.

With field inversion, we observe that as the resonant mirror scan angle goes from −22.5 degrees to zero, the fair field scan angle f ranges from zero to −22.5 degrees. This "flip" is expressed mathematically by the formula for f, where there is a shift (4z) and a negative sign relating the vertical to horizontal axis. The moment the mirror scan moves from 0− to 0+, the far field scan angle f flips from −22.5 degrees to 21 degrees. In the absence of overlap, this flip would end up at 22.5 degrees rather than 21 degrees. The difference between overlapped and non-overlapped scans can be defined and achieved in real-time with a hinge as discussed below. Since we begin the far field scan angle at 21 degrees, and we must swing through 22.5 degrees net in the scanning mirror, we end at −1.5 degrees in the other direction (as opposed to zero as we would for non-overlapped field inversion). It is this change that provides the beneficial effect of overlapping because we now scan through the horizon twice for each scan leg (where it is expected there will be a need for more range point detection).

The horizontal axis of FIG. 8 is the angle to which the scanning mirror (e.g., MEMS mirror) is "looking". Because the scanning mirror is slowest when it changes direction, we can see from the curve at the top of FIG. 8 that the scanning mirror is moving fastest at the center (0 degrees). It is also moving slowest at the edges of the scan (in this example at −22.5 degrees and 22.5 degrees). As discussed above, this can be problematic for practitioners when the center region is the area where it is desirable to maximize gaze time (to increase how many range points are lased in the center region) (e.g., for automotive applications, the center region is where most accidents are likely to occur). The vertical axis in FIG. 8 is the location in the far field where the ladar transmitter is gazing, i.e. the instantaneous field of view. In a traditional, non-inverted field of view, this gaze location would be equal to the horizontal axis. If zoom or upscope is added to the ladar transmitter, the relationship remains linearly proportional. This means the "bad" edge gaze of the scanning mirror is "inherited" in the ladar transmitter's gaze into the scene. Since the scanning mirror's scan position alone determines where in the scene that the instantaneous gaze is located, there is a curve that we can plot that represents the relationship connecting these two axes. While the example of FIG. 8 is shown for only one resonant scanning mirror, the same idea works for 2D resonant mirror scanning but is more complex with respect to articulation, so for ease of illustration the single resonant scanning mirror example is shown. For standard non-inverted ladar transmitters, this relationship curve is simply a straight continuous line. However, with field inversion, as shown by FIG. 8, the curve is presented by two line segments with a "jump" reflected around the vertical axis. The end result is seen in the plot of the speed of the instantaneous field of view within the scene to be imaged at the far right of FIG. 8. Relative to the top plot of FIG. 8, the speed is inverted vis a vis the horizontal, MEMS axis. Indeed, we now stare a relatively longer time at 0 degrees (where speed is slow) and spend relatively less time at the scene edges (where speed is high).

With regard to overlapping the inverted view, we can choose to scan beyond zero at one or both edges of the mirror scan. FIG. 8 shows an example where the right hand scan (and only the right hand scan in this example) is selected for overlap. One can see that the scene is inspected a 0 degrees and down to −1.5 degrees on the right hand scan, which increases the amount of time we gaze at the centerline of 0 degrees and environs via overlapping.

Figure 6D:
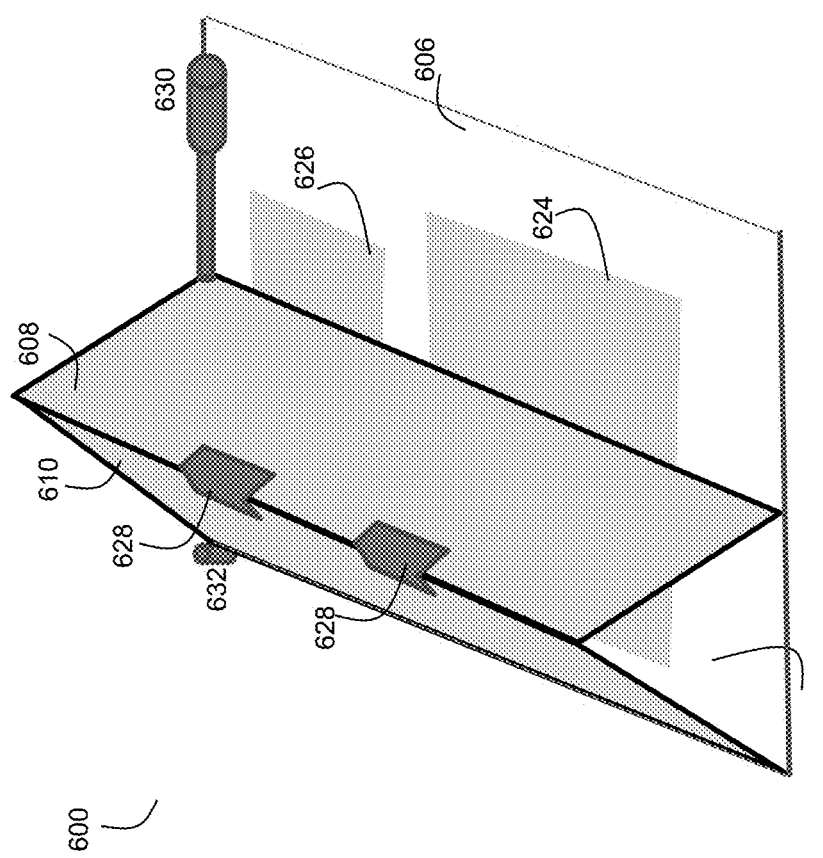
FIG. 6D shows an example embodiment of a hinged field splitter/inverter that exhibits an adjustable mirror pitch angle.

To control and adjust how much overlap is achieved, one or more controlled hinges 628 can be used to define the mirror pitch angle z+, as shown by FIG. 6D. Hinges 628 allow for the mirror pitch angle of the prism 600 to be adjusted. A mirror pitch angle adjustment mechanism (such as a threaded knob arrangement 630 and 632 by which the mirrors 608 and 610 are pivoted at hinges 628 to adjust the mirror pitch angle) can be used to slide mirrors 608 and 610 along base 606. This results in the ability to dynamically adjust the degree of backscan and or the Field of View in real-time, at sub-second rates. By adjusting the mirror pitch angle z+, the scan volume and overlap of the field inverter is dynamically controlled. Specifically, the midfield and far field angles S and f become tunable using a mechanical actuator to adjust the intersection of right and left mirrors 608 and 610 with the plane subtending the reflector 606.

It should be understood that still other embodiments for a field inverter 600 could be used by a practitioner. For example, the reflector 606 could be replaced with a scanning mirror to add more compaction and shrink the spans shown in FIG. 7 in exchange for potential occlusion from non-reflecting material at the boundary of 606.

FIG. 9 depicts a table that demonstrates the effect of increased gaze times that can be achieved via field inversion (non-overlapped) and overlapped field inversion. The table of FIG. 9 is based on a 90 degree scan range, and it shows the results of measuring the time spent near the centerline (within 3 degrees of the centerline) over each scan for a standard operation (no field inversion), field inversion operation (non-overlapped), and an overlapped field inversion (with a 1 degree split field for 5 mrad beam divergence).

As can be seen, field inversion and non-overlapped field inversion yield significant improvements in dwell time near the centerline.

Lissajous Scan Patterns with Induced Periodic Phase Drift:

A 2D laser scan pattern is called a Lissajous scan pattern if and only if the 2D beam scans sinusoidally (in time) along each axis. The phase of both azimuth and elevation can be arbitrary, but are fixed in a standard Lissajous scan. The Lissajous pattern is generally desirable when one wants the fastest possible scans. This is because the fastest mirrors are resonant mirrors which must be driven periodically and resonantly, and hence sinusoidally. Thus, in a Lissajous scan pattern, both mirrors 250 and 252 will be driven by sinusoidal signals. While both phases of these sinusoids are free, the difference between them impacts scan performance. The usual choice for the phase difference $\xi$ amongst practitioners is 90 degrees, which minimizes the maximum gap between where adjacent beams scan.

The Lissajous can pattern for a 2D resonant beam scanner can be expressed as:

$$[\text{height}(t), \text{azimuth}(t)] = [A_h \sin(ft), A_{az} \sin((f+1)t+\xi)] \tag{Eq1}$$

The resonant frequencies f,f+1 differ by only 1 in most applications as this is well-known to minimize gap times.

FIG. 10A depicts an example of a Lissajous scan pattern for a ladar transmitter when no field inverter 300 is employed. The axes in FIG. 10A are an X-axis corresponding to horizon/azimuth and a Y-axis corresponding to elevation. The lines in FIG. 10A are a tracing that shows where the ladar transmitter is targeted as the mirrors scan. The white regions are the spacings or gaps that would exist between beams that are theoretically fired all along the scan lines. The FIG. 10A plot shows how a standard Lissajous scan results in denser visits at the edges of the scan area relative to a center region of the scan area. That is, FIG. 10A shows that there are larger gaps between the scan lines in the center region of the plot than there are at the edges. This is contradictory to most desired applications (such as most automotive applications) where denser visits are desired at the center region.

As mentioned above, a field inverter 300 such as prism 600 can be used to split and invert a scan pattern, which when applied to the Lissajous scan pattern of FIG. 10A yields a scan pattern with increased gaze time near the center region, as shown by the example of FIG. 10B. FIG. 10B depicts an example of a split/inverted Lissajous scan pattern when a field inverter 300 is employed to provide inversion along the horizon (i.e., the horizontal axis when the elevation is zero), and FIG. 10B shows that the density of visits by the ladar transmitter near the center line is greatly increased relative to that of FIG. 10A. This difference is dramatic, as the gaps along the horizon are virtually eliminated.

Figure 11B:
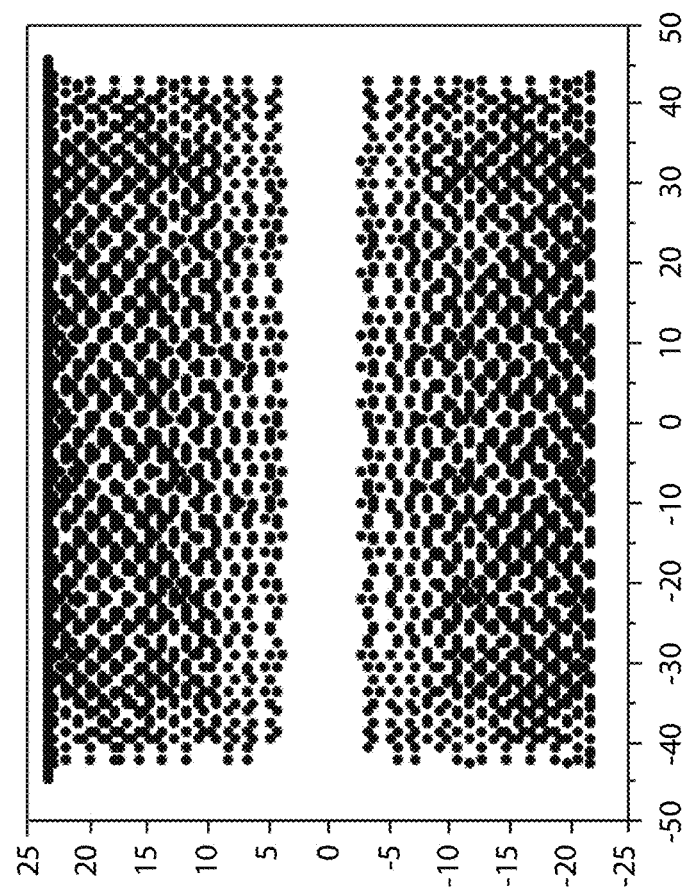
FIGS. 11A and B depict where scan gaps exist in connection with the scan patterns of FIGS. 10A and 10B respectively.
Figure 11A:
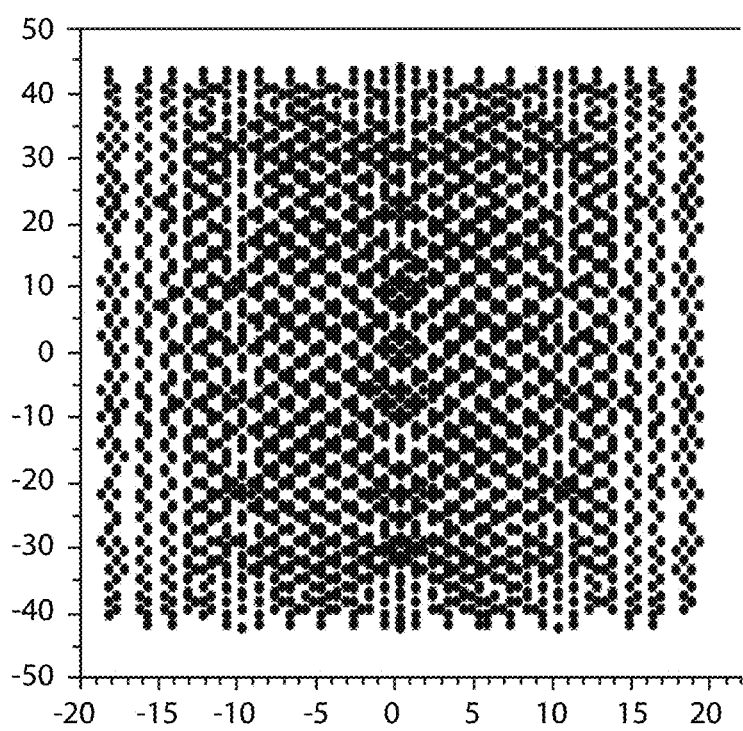

Another way to measure the significance of these gaps is to determine which gaps exceed a defined threshold. This threshold can be defined based on beam divergence to account for the profile/diameter of a laser pulse 108 at an assumed distance with respect to a targeted range point. If the gap is larger than the threshold, this would represent a potential blindspot that could not be targeted by the ladar transmitter. However, if the gap is smaller than the threshold, such a small gap could be subsumed by a laser pulse 108 targeted nearby. FIG. 11A shows a series of dots which represent potential blindspots for the ladar transmitter when a Lissajous scan pattern such as that shown by FIG. 10A is employed (with no field inverter 300). As can be seen, there are a relatively large amount of blindspots in the center region of the plot. FIG. 11B shows the corresponding blindspot plot for the inverted Lissajous scan pattern of FIG. 10B (once again, where each dot represents a potential blindspot). As can be seen by FIG. 11B, the combination of the field inverter 300 with the Lissajous scan pattern yields a ladar transmitter with a significant blindspot-free zone in the center region.

However, FIG. 11B shows that blindspots do exist in the split/inverted Lissajous scan pattern in regions outside the center region. This raises the question of how the system can be design to reduce the extent of such blindspots, ideally in a manner that allows the system to intelligently select desired regions for increased gaze that are not necessarily inside the center region.

As solution to this problem, the inventors disclose the use of an induced periodic phase drift in the Lissajous scan pattern. With this approach, the fixed phase that is common in Lissajous scan patterns is replaced with a time-varying drift. One (or both) of the scanning mirrors 250/252 is driven slightly off resonance by gently varying its phase. Accordingly, with this embodiment, we can represent the phase as $\xi(t)$ rather than $\xi$ as shown above by Equation 1 in the formulaic representation of the Lissajous scan pattern. This phase drift $\xi(t)$ is induced by having the beam scanner controller slowly vary a command signal provided to a driver for the subject scanning mirror (e.g., where the driver could be a motor for a stepped scan or a piston for a MEMs mirror). This command signal controls the mirror with respect to how it scans. In an example embodiment, the phase drift can be represented as:

$$\xi(t) = \sum_{i=1}^{M/2} A_i \sin(K_i t + \mu_i) \tag{Eq2}$$

Accordingly, the Lissajous scan pattern as modified to include the induced periodic phase drift in both dimensions can be represented by:

$$[\text{height }(t), \text{azimuth }(t)]_{drifted} = \left[ A_h \sin\left( ft + \sum_{i=1}^{M/2} A_i \sin(K_i t + \mu_i) \right), \right. \tag{Eq3}$$

$$\left. A_{az} \sin\left( (f+1)t + \sum_{i=1+\frac{M}{2}}^{M} A_i \sin(K_i t + \mu_i) \right) \right]$$

In this expression, we denote M as the total number of phase frequency drift components across both mirrors. We can take all M drift components and apply them to one of the scanning mirrors, or as shown in the above formula, we can distribute the phase frequency drift components across both scanning mirrors. This distribution can be an even distribution or some other distribution. It should be understood that even with a single resonant mirror, a system can still benefit from the induced drift in terms of increasing gaze time in targeted regions, although we will describe the example embodiment in terms of two mirrors scanning at resonance. For a linearized approximation of Equation 3, associated with small amplitudes $A_i$, we have:

$$[\text{height }(t), \text{azimuth }(t)]_{drifted} \approx \tag{Eq4}$$

$$\left[ A_h \left( \sin(ft) + \cos(ft) \sum_{i=1}^{\frac{M}{2}} A_i \sin(K_i t + \mu_i) \right), \right.$$

$$A_{az}\left(\sin(\text{ft}+t)+\cos(\text{ft}+t)\sum_{i=M/2}^{M}A_i\sin(K_i t+\mu_i)\right)\Bigg]$$

For this example discussion, we can set M=4 to simplify the narrative, and we will ignore phase drift terms $\mu_i$ with the understanding that, for the example embodiment where a total least squares approach is used to find the desired drift, the terms $\mu_i$ behave just like the drift frequency terms K1, . . . during optimization and actuation.

It is also advantageous for the phase drift to be periodic with a harmonic sub-period of the initial pattern, i.e., where $$\frac{K_i}{f},\frac{K_{M/2+i}}{f+1}$$

are rational and less than unit modulos. This assures that the revisit time is not reduced, thereby ensuring that the gap reductions are not achieved at the cost of a slower pattern revisit time.

With regarding to choosing the periodic drift frequencies Ki, there will be tradeoffs involved. If we choose periodic drift frequencies Ki that are too close to the Lissajous frequency f, then there will be very little effect on the pattern because the phase rate of change will blur into the frequency. Also, if the drift frequency is too low, the phase rate of change blurs into the fixed phase term of the Lissajous pattern. In the examples presented below, we describe an embodiment where the drift frequencies are set to lie at the midpoint prior to iteration. However, it should be understood that these are examples only and other values could be chosen.

In an example embodiment, an optimal phase for fixed drift frequency is determined as a solution to a total least squares problem. Total least squares (TLS) fits parameters when both dependent and independent variables are free, which will be the case here with the independent variable for TLS being time. The minimization employs a cost function. As an example, consider automotive ladar where we select a region in the ground plane as the area where we wish to remove gaps.

Figure 12:
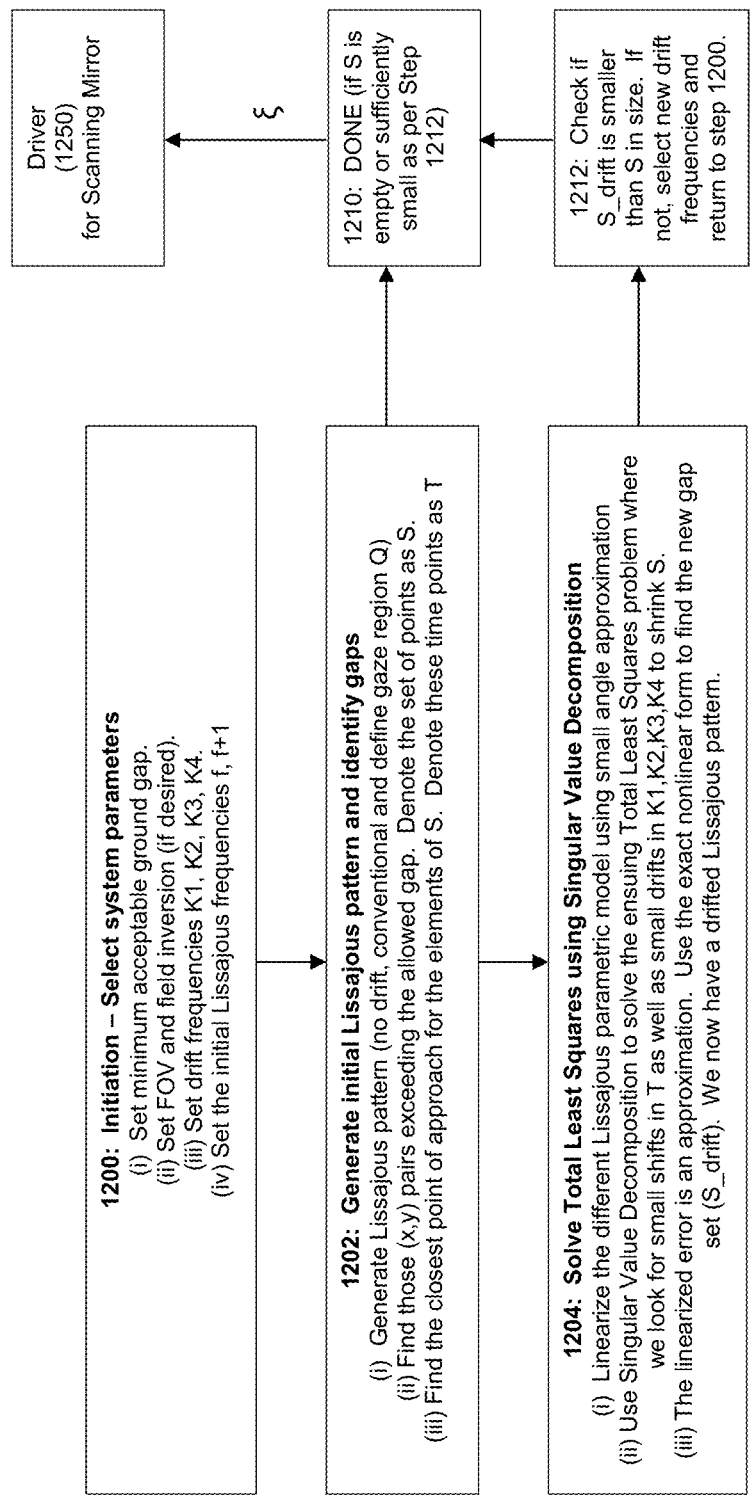
FIG. 12 depicts an example process flow for inducing a periodic phase drift into a Lissajous scan pattern.

FIG. 12 discloses an example process flow for controlling how a scanning mirror is induced with a periodic phase drift. Driver 1250 for a scanning mirror includes an actuator which can periodically modulate the phase ξ using parameters $A_{az}$, $A_h$,$A_i$,$K_i$,$\mu_i$, i=1, . . . , M while retaining the frequencies f,f+1. Step 1204 in FIG. 12 describes frame-dependent feedback in the scan pattern for the scanning mirror centered on total least squares The use of singular value decomposition (SVD) assures that the FIG. 12 process flow can be executed in real-time, specifically on the order of milliseconds.

Figure 13A:
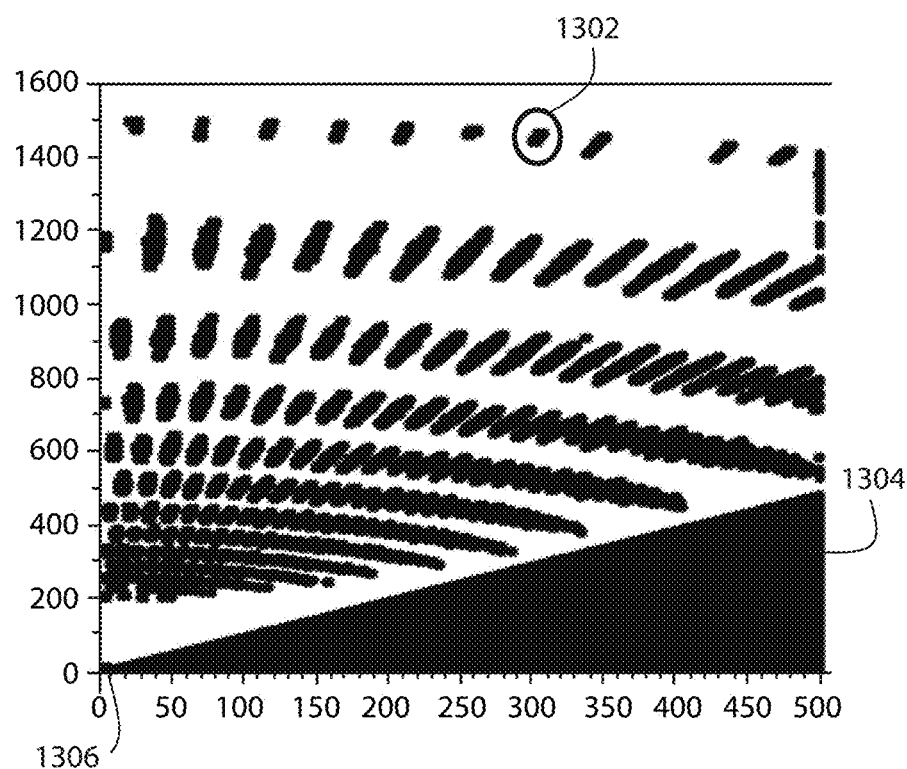
FIGS. 13A and B depict scan gaps projected onto a ground plane for example use cases of a non-inverted Lissajous scan and an inverted Lissajous scan respectively.

At step 1200, the process flow is initiated via selection of system parameters. As part of this, the minimum acceptable ground gap is defined. This can be set as an angle or a distance in meters. We chose the gap in meters for an example embodiment. We compute the gaps by looking at where the pulses can be fired from scan to scan, and measuring if the distance is larger than this amount, measured as an extent beyond the full width half maximum of beam divergence. We declare a gap, and use that gap in calculating phase drift when, as shown in 1202-1204, the gaps are (i) larger than 1 m, and (ii) within the preferred scene (gaze region) Q. Examples of this are shown in FIG. 13A (for a non-inverted case) and FIG. 13B (for an inverted case), where f=49. The black regions in FIGS. 13A and 13B (e.g., see 1302) are the regions in the x,y axis which are further away than 1 meter by 1 meter from a laser pulse for all values of time t in Equation 1 above. In this example, the ground plane is used to determine gaps. However, in another embodiment, one could use the azimuth elevation plane for identifying gaps, in which case we would use the black cluster in FIGS. 11A and B rather than FIGS. 13A and B.

Next, the drift frequencies are selected (where, for M=4 in this example, 2 drift frequencies are used for each scan axis). We also select the Lissajous frequencies f,f+1, field of view (FOV) and the tolerable gap size. The Lissajous frequencies will be set by the transmitter control instructions, 103. The FOV will be determined by the speed of the mirror scans as well as the desired region we wish the laser to inspect, coupled with the gaps. For example, if the maximum scan frequency is 10 Khz, and we scan across 100 degrees, with 1 microsecond pulse spacing, the gaps will be about three degrees, if we scan across 20 degrees at 10 microseconds the gaps will be 4 deg. For example, with FIGS. 13A and B, the FOV is +/−45 degrees in azimuth (as evidenced by the slope of black triangle 1304). Likewise, the vertical FOV ranges from the horizon down to 12 degrees, as evidenced by the small black rectangle 1306 near 0,0 assuming a 2 meter height monitoring of the ladar transmitter.

For the purposes of phase drift, the only part of the FOV that matters is the range below the horizon, so the upper limit of the elevation FOV beyond zero is immaterial (as indicated in FIG. 13A by no black dots being shown above 1600 feet and in FIG. 13B by no black dots being shown above 800 feet).

Figure 13B:
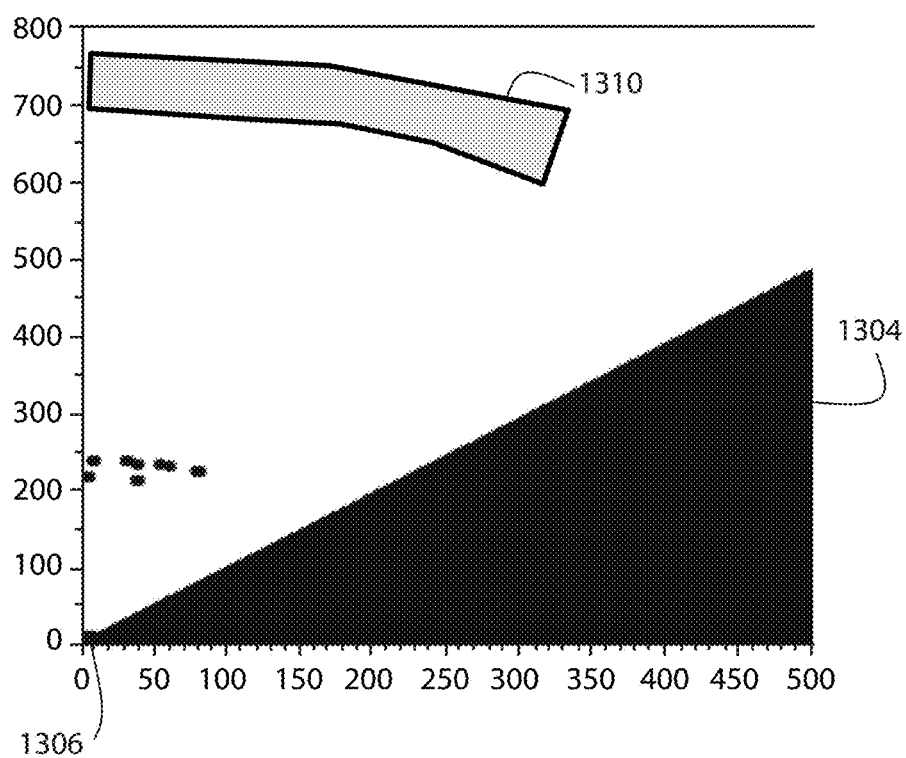

At step 1202, we generate the standard fixed phase Lissajous pattern according to the defined parameters. FIG. 13A shows the gaps for a standard Lissajous pattern where f,f+1 is 49,50 and no inversion takes place, and FIG. 13B shows the gaps for a standard Lissajous pattern where f,f+1 is 49,50 and where inversion with a 1 degree overlap takes place. FIGS. 11A and B show the respective gaps in the vertical (laser line of sight) for the non-inverted and inverted space for a 3 mrad beam width, and FIGS. 13A and B show these same gaps projected onto the ground plane with a one meter gap tolerance. Region 1310 shows gaze region Q where gap reduction is desired. The gaze region enters into the processing stream in FIG. 12 in section labeled 1202. Only the gaps in this section are used in the subsequent algorithm stages, all other regions are ignored. In our example all the gaps are removed in 1310, which is why we labeled them grey. Region 1310 can exhibit any shape, and it can be selected based on the environmental scene (see 120 in FIG. 1B). For example, consider a case where we have a side road that we wish to scan near its intersection of a ladar transmitter-equipped vehicle which is moving, along azimuth=0, from 0 to 800 feet where the intersection arises. The Q selection might be either data adaptive (we observe traffic moving along the region 1310 and seek to investigate) or it may be selected from a priori information (such as a road network map). The size of M will determine the rate of change for the Q selectin that is allowable in real-time. Preliminary work indicates that M=4 works quite nicely and easily converges in time to update at a millisecond rate. In our example, the projections are to a ground plane, but it should be understood that any projected surface will do, incorporating terrain elevation or other considerations that might replace ground planes with other topological manifolds.

The detected gaps that exceed the defined minimum accepted gap are grouped into a set of points as S. Thus, S will be a collection of points that represent the black dots 1302 in FIG. 13A (or 13B).

Next, Equation 1 is used to find the times t that are yield coordinates that are closest to each point in S. These times can be denoted in the set T.

Step 1204 follows where we solve the TLS solution using the principal components from steps 1202 and 1204. In the following description, we will restrict the embodiment to ground plane gaze, with field inversion and overlap. First, we linearize using Equation 4 with times t set based on the elements in T. The TLS solution will pick pairs $A_i$, $\mu_i$ as well as updated time stamp T based on the linearized Taylor series representation of the drift. We can now substitute these values into Equation 3, and from this find the new (generally smaller) set of black dots that define a new set which we will denote as S_drift. Next, we recurse again, resolving TLS over time stamps, amplitudes, and drift phases and frequencies until a desired performance level is achieved.

As per step 1210, if at any point S or S_drift is zero, we inject the phase drift controls corresponding to that S or S_drift into driver 1250. There are two mutually exclusive and collectively exhaustive outcomes of this procedure. The first is that the set in S no longer shrinks (see step 1212), in which case we can update the Lissajous parameters [K,f] and repeat to test if performance improves (S,S_drift is reduced). Alternatively, S,S_drift reduces to a size that is deemed worthy of termination (or vanishes entirely).

Figure 14B:
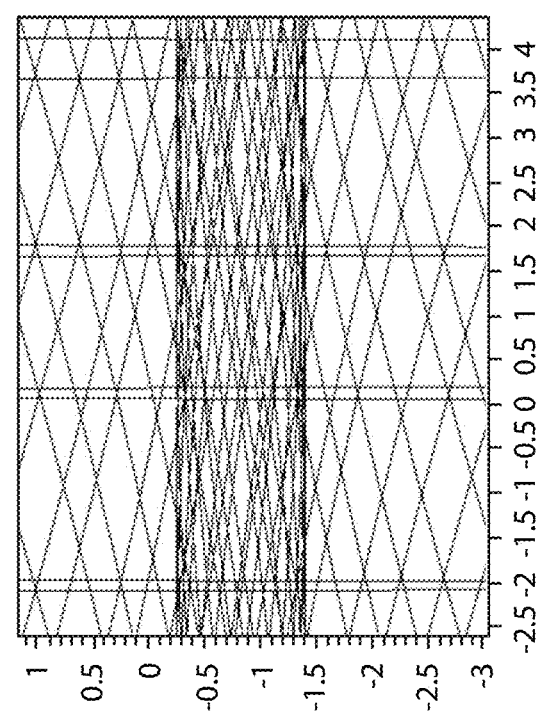
FIGS. 14A and 14B show example inverted Lissajous scan patterns with induced phase drift and no induced phase drift respectively.
Figure 14A:
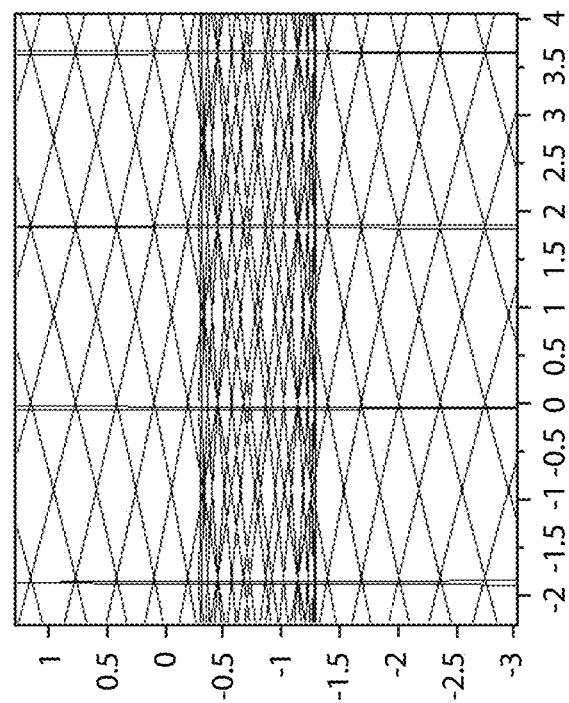

For an example run, all of the black dots in region 1310 of FIG. 13B can be removed (i.e., S_drift is empty). The example run took only 1 Mflops, executable in 1 ms for 1 Gflop processor, which is fast enough to be updated on a single frame basis. The zoom of the field inverted and phase drifted overlapped pattern is shown by FIG. 14A. FIG. 14B shows the corresponding non-phase drifted Lissajous pattern. FIGS. 14A and B zoom in near the horizon since that is where the main activity occurs, and an inspection of FIGS. 14A and B reveals clues as to how the induced phase drift improves performance and removes gaps. First, we note that in both cases the scan range region is shown in expanded view since the full view plot in FIGS. 10A and B is too coarse to garner insight. Next, we note that there is a lot of scanning slightly below the horizon, and this region has very tight spacing between laser scans. This is combined feature of both field inversion and overlapped coverage, common to both examples. In both cases we have chosen to tune the two mirror field inverter to place renewed emphasis on the elevation scan between about −0.3 degrees and −1.2 degrees in elevation. Inspection of FIG. 14A shows that within the dense scan region and the coarser scan region (above −0.2 degrees elevation and below 1.2 degrees elevation), the diamond-shaped gap regions are irregular, and more irregular than in FIG. 14B. This is the gift that the FIG. 12 process flow bestows by determining the best way to drift the phase so as to drive down the set S. Also, we note that the vertical stripes in FIG. 14A are more spaced apart than they are in FIG. 14B. This is a result of the phase drift bifurcating the revisit pattern and replaced diamond gaps with tighter gaps.

Accordingly, it should be understood that the induced phase drift can be used to intelligently selection regions of the scan area for longer dwelling gaze. Moreover, when combined with a field inverter 300, the use of mirrors scanning in a Lissajous pattern with induced phase drift is expected to provide significant performance improvements that allows for better interrogation of desirable regions in a scan area per frame.

While the invention has been described above in relation to its example embodiments, various modifications may be made thereto that still fall within the invention's scope. Such modifications to the invention will be recognizable upon review of the teachings herein. For example, while Lissajous scan patterns are disclosed as being a prime example of scan patterns that can be enhanced via field inversion and induced periodic phase drift, it should be understood that spiral scan patterns can be similarly enhanced. Such patterns are often implemented as dampened Lissajous patterns where the amplitude is slowly modulated.

What is claimed is:

1. A method comprising:
    positioning an optical field splitter/inverter optically downstream from a first mirror and a second mirror;
    scanning the first mirror at a sinusoidal frequency to define a periodic scan pattern along a first axis within a scan area;
    scanning the second mirror to define another scan pattern along a second axis within the scan area, wherein the scanning of the first and second mirrors defines the scan area;
    splitting and inverting the scan area via the optical field splitter/inverter; and
    transmitting a plurality of light pulses to the split and inverted scan area via the scanning first and second mirrors and the optical field splitter/inverter;
    wherein the scanning of the first and second mirrors defines a target scan area within the split and inverted scan area for a ladar transmitter that transmits the light pulses; and
    wherein the positioning step comprises positioning the field splitter/inverter downstream from the first and second mirrors such that the target scan area of the ladar transmitter moves relatively slower in a middle section of the split and inverted scan area than it does at outer sections of the split and inverted scan area.

2. A method comprising:
    scanning a first mirror at a sinusoidal frequency to define a periodic scan pattern along a first axis within a scan area;
    scanning a second mirror to define another scan pattern along a second axis within the scan area, wherein the scanning of the first and second mirrors defines the scan area;
    splitting and inverting the scan area via an optical field splitter/inverter that is positioned optically downstream from the first and second mirrors, wherein the field splitter/inverter comprises a triangular prism shape; and
    transmitting a plurality of light pulses to the split and inverted scan area via the scanning first and second mirrors and the optical field splitter/inverter.

3. The method of claim 2 wherein the triangular prism shape includes a first triangular face and a second triangular face at opposite ends of the triangular prism shape, wherein the triangular prism shape further includes a first side, a second side, and a third side, wherein the first, second, and third sides connect to the first and second triangular faces;
    wherein at least a portion of an interior of the first, second, and third sides comprise mirrors; and wherein the transmitting step further comprises reflecting light pulses from the scanning first and second mirrors off the interior mirrors to achieve the split and inverted scan area.

4. The method of claim 3 wherein the triangular prism shape includes an injection region, wherein the transmitting step further comprises:
the field splitter/inverter receiving the light pulses from the scanning first and second mirrors through the injection region.

5. The method of claim 4 wherein the interior mirrors are one-way mirrors.

6. The method of claim 5 wherein the one-way interior mirrors encompass the injection region such that the injection region also serves as a bounce region for the light pulses.

7. The method of claim 2 wherein the triangular prism shape includes a mirror pitch angle, the method further comprising:
defining the mirror pitch angle to provide an overlapped split and inverted scan area.

8. The method of claim 7 wherein the field splitter/inverter includes a hinge, and wherein the defining step comprises selectably adjusting the mirror pitch angle via the hinge.

9. A method comprising:
scanning a first mirror at a sinusoidal frequency to define a periodic scan pattern along a first axis within a scan area;
scanning a second mirror to define another scan pattern along a second axis within the scan area, wherein the scanning of the first and second mirrors defines the scan area;
splitting and inverting the scan area via an optical field splitter/inverter that is positioned optically downstream from the first and second mirrors, wherein the field splitter/inverter comprises a W shape; and
transmitting a plurality of light pulses to the split and inverted scan area via the scanning first and second mirrors and the optical field splitter/inverter.

10. The method of claim 1 wherein the first mirror scanning step comprises scanning the first mirror at a resonant frequency.

11. A method comprising:
scanning a first mirror at a first sinusoidal resonant frequency to define a periodic scan pattern along a first axis within a scan area;
scanning a second mirror at a second resonant sinusoidal frequency to define another scan pattern along a second axis within the scan area, wherein the scanning of the first and second mirrors defines (1) the scan area and (2) a Lissajous scan pattern for the scanning first and second mirrors;
splitting and inverting the scan area via an optical field splitter/inverter that is positioned optically downstream from the first and second mirrors; and
transmitting a plurality of light pulses to the split and inverted scan area via the scanning first and second mirrors and the optical field splitter/inverter.

12. The method of claim 11 wherein the first resonant frequency is a frequency of f, and wherein the second resonant frequency is a frequency of f+1.

13. A method comprising:
scanning a first mirror at a sinusoidal frequency to define a periodic scan pattern along a first axis within a scan area;
scanning a second mirror to define another scan pattern along a second axis within the scan area, wherein the scanning of the first and second mirrors defines the scan area;
splitting and inverting the scan area via an optical field splitter/inverter that is positioned optically downstream from the first and second mirrors;
transmitting a plurality of light pulses to the split and inverted scan area via the scanning first and second mirrors and the optical field splitter/inverter, wherein the light pulses include light at a first and second wavelength;
selectably reflecting light within the light pulses at the second wavelength toward a position sensor via a dichroic mirror; and
the position sensor sensing the reflected light at the second wavelength, the sensed light being indicative of a position of the scanning first or second scanable mirrors.

14. The method of claim 13 further comprising:
adjusting the scanning of the first or second scanable mirrors based on the sensed reflected light to compensate for nonlinear time warping in the scanning due to mechanical imperfections and resonant impurities.

15. The method of claim 2 wherein the first mirror comprises a MEMS mirror.

16. The method of claim 2 wherein the second mirror comprises a MEMS mirror.

17. A method comprising:
scanning a first mirror at a sinusoidal frequency to define a periodic scan pattern along a first axis within a scan area;
scanning a second mirror to define another scan pattern along a second axis within the scan area, wherein the scanning of the first and second mirrors defines the scan area;
splitting and inverting the scan area via an optical field splitter/inverter that is positioned optically downstream from the first and second mirrors;
transmitting a plurality of light pulses to the split and inverted scan area via the scanning first and second mirrors and the optical field splitter/inverter;
employing ray tracing to identify regions within the field splitter/inverter that will receive and reflect the light pulses as a result of the scanning; and
applying a reflective coating to the identified regions.

18. The method of claim 17 further comprising:
not applying reflective coating to regions within the field splitter/inverter that are outside the identified regions.

19. A method comprising:
scanning a first mirror at a sinusoidal frequency to define a periodic scan pattern along a first axis within a scan area;
scanning a second mirror to define another scan pattern along a second axis within the scan area, wherein the scanning of the first and second mirrors defines the scan area;
splitting and inverting the scan area via an optical field splitter/inverter that is positioned optically downstream from the first and second mirrors;
transmitting a plurality of light pulses to the split and inverted scan area via the scanning first and second mirrors and the optical field splitter/inverter; and
inducing a periodic phase drift in the scanning of at least one of the first and/or second mirrors which is scanning at a resonant frequency.

20. The method of claim 19 wherein the inducing step comprises:
varying a command signal to a driver for the at least one of the first and/or second mirrors such that the scanning includes the periodic phase drift over time.

21. The method of claim 19 wherein the inducing step comprises:
inducing the periodic phase drift in the scanning of at least one of the first and/or second mirrors without altering the fundamental period.

22. The method of claim 19 further comprising:
computing the induced periodic phase drift according to a total least squares method using time as an independent variable.

23. The method of claim 19 wherein the inducing step comprises inducing the periodic phase drift in the scanning of only one of the first and second mirrors.

24. The method of claim 19 wherein the resonant frequency is a first resonant frequency, and wherein the second mirror scanning step comprises scanning the second mirror at a second resonant frequency to define a Lissajous scan pattern for the scanning first and second mirrors; and
wherein the inducing step comprises inducing the periodic phase drift in the scanning of both the first and second mirrors such that the periodic phase drift is spread across the first and second scanable mirrors.

25. A beam scanner apparatus for a ladar transmitter, the apparatus comprising:
a first scanable mirror configured to scan to a plurality of scan positions with respect to a first axis of a scan area;
a second scanable mirror positioned optically downstream from the first scanable mirror, the second scanable mirror configured to scan to a plurality of scan positions with respect to a second axis of the scan area, wherein the scan positions of the first and second scanable mirrors define where the ladar transmitter is targeted within the scan area;
a beam scanner controller configured to drive the first and second scanable mirrors to scan along the first and second axes to define a scan pattern for targeting by the ladar transmitter within the scan area, wherein the beam scanner controller is further configured to drive the first and second scanable mirrors such that at least one of the first scanable mirror and/or the second scanable mirror scans at a sinusoidal frequency; and
an optical field splitter/inverter positioned optically downstream from the first and second scanable mirrors to split and invert the scan area defined by the first and second scanable mirrors, wherein the field splitter/inverter is positioned such that the targeting of the ladar transmitter moves relatively slower in a middle section of the split and inverted scan area than it does at outer sections of the split and inverted scan area.

26. A beam scanner apparatus for a ladar transmitter, the apparatus comprising:
a first scanable mirror configured to scan to a plurality of scan positions with respect to a first axis of a scan area;
a second scanable mirror positioned optically downstream from the first scanable mirror, the second scanable mirror configured to scan to a plurality of scan positions with respect to a second axis of the scan area, wherein the scan positions of the first and second scanable mirrors define where the ladar transmitter is targeted within the scan area;
a beam scanner controller configured to drive the first and second scanable mirrors to scan along the first and second axes to define a scan pattern for targeting by the ladar transmitter within the scan area, wherein the beam scanner controller is further configured to drive the first and second scanable mirrors such that at least one of the first scanable mirror and/or the second scanable mirror scans at a sinusoidal frequency; and
an optical field splitter/inverter positioned optically downstream from the first and second scanable mirrors to split and invert the scan area defined by the first and second scanable mirrors, wherein the field splitter/inverter comprises a triangular prism shape.

27. The apparatus of claim 26 wherein the triangular prism shape includes a first triangular face and a second triangular face at opposite ends of the triangular prism shape, wherein the triangular prism shape further includes a first side, a second side, and a third side, wherein the first, second, and third sides connect to the first and second triangular faces;
wherein at least a portion of an interior of the first, second, and third sides comprise mirrors; and
wherein the triangular prism shape is arranged and positioned to receive light pulses from the first and second scanable mirrors and reflect the received light pulses off the interior mirrors to achieve the split and inverted scan area.

28. The apparatus of claim 27 wherein the triangular prism shape includes an injection region through which light pulses are received from the first and second scanable mirrors.

29. The apparatus of claim 28 wherein the interior mirrors are one-way mirrors.

30. The apparatus of claim 29 wherein the one-way interior mirrors encompass the injection region such that the injection region also serves as a bounce region for the light pulses.

31. The apparatus of claim 26 wherein the triangular prism shape includes a mirror pitch angle that is angled to provide an overlapped split and inverted scan area.

32. The apparatus of claim 31 wherein the field splitter/inverter includes a hinge for selectably adjusting the mirror pitch angle.

33. A beam scanner apparatus for a ladar transmitter, the apparatus comprising:
a first scanable mirror configured to scan to a plurality of scan positions with respect to a first axis of a scan area;
a second scanable mirror positioned optically downstream from the first scanable mirror, the second scanable mirror configured to scan to a plurality of scan positions with respect to a second axis of the scan area, wherein the scan positions of the first and second scanable mirrors define where the ladar transmitter is targeted within the scan area;
a beam scanner controller configured to drive the first and second scanable mirrors to scan along the first and second axes to define a scan pattern for targeting by the ladar transmitter within the scan area, wherein the beam scanner controller is further configured to drive the first and second scanable mirrors such that at least one of the first scanable mirror and/or the second scanable mirror scans at a sinusoidal frequency; and
an optical field splitter/inverter positioned optically downstream from the first and second scanable mirrors to split and invert the scan area defined by the first and second scanable mirrors, wherein the field splitter/inverter comprises a W shape.

34. A beam scanner apparatus for a ladar transmitter, the apparatus comprising:
- a first scanable mirror configured to scan to a plurality of scan positions with respect to a first axis of a scan area;
- a second scanable mirror positioned optically downstream from the first scanable mirror, the second scanable mirror configured to scan to a plurality of scan positions with respect to a second axis of the scan area, wherein the scan positions of the first and second scanable mirrors define where the ladar transmitter is targeted within the scan area;
- a beam scanner controller configured to drive the first and second scanable mirrors to scan along the first and second axes to define a scan pattern for targeting by the ladar transmitter within the scan area, wherein the beam scanner controller is further configured to drive the first scanable mirror at a sinusoidal resonant frequency; and
- an optical field splitter/inverter positioned optically downstream from the first and second scanable mirrors to split and invert the scan area defined by the first and second scanable mirrors.

35. The apparatus of claim 34 wherein the beam scanner controller is further configured to drive the first and second scanable mirrors such that the first scanable mirror is driven at a first resonant frequency while the second scanable mirror is driven at a second resonant frequency, the first and second resonant frequencies cooperating together so that the ladar transmitter targets within the scan area according to a Lissajous scan pattern.

36. The apparatus of claim 35 wherein the first resonant frequency is a frequency of f, and wherein the second resonant frequency is a frequency of f+1.

37. A beam scanner apparatus for a ladar transmitter, the apparatus comprising:
- a first scanable mirror configured to scan to a plurality of scan positions with respect to a first axis of a scan area;
- a second scanable mirror positioned optically downstream from the first scanable mirror, the second scanable mirror configured to scan to a plurality of scan positions with respect to a second axis of the scan area, wherein the scan positions of the first and second scanable mirrors define where the ladar transmitter is targeted within the scan area;
- a beam scanner controller configured to drive the first and second scanable mirrors to scan along the first and second axes to define a scan pattern for targeting by the ladar transmitter within the scan area, wherein the beam scanner controller is further configured to drive the first and second scanable mirrors such that at least one of the first scanable mirror and/or the second scanable mirror scans at a sinusoidal frequency;
- an optical field splitter/inverter positioned optically downstream from the first and second scanable mirrors to split and invert the scan area defined by the first and second scanable mirrors;
- a dichroic mirror positioned proximate to an injection region for the field splitter/inverter, wherein the dichroic mirror is configured to selectively reflect received light of a specified wavelength; and
- a position sensor positioned and configured to sense light reflected by the dichroic mirror, the sensed light being indicative of a position of the first or second scanable mirrors.

38. The apparatus of claim 25 wherein the first scanable mirror comprises a MEMS mirror.

39. The apparatus of claim 25 wherein the second scanable mirror comprises a MEMS mirror.

40. A beam scanner apparatus for a ladar transmitter, the apparatus comprising:
- a first scanable mirror configured to scan to a plurality of scan positions with respect to a first axis of a scan area;
- a second scanable mirror positioned optically downstream from the first scanable mirror, the second scanable mirror configured to scan to a plurality of scan positions with respect to a second axis of the scan area, wherein the scan positions of the first and second scanable mirrors define where the ladar transmitter is targeted within the scan area;
- a beam scanner controller configured to drive the first and second scanable mirrors to scan along the first and second axes to define a scan pattern for targeting by the ladar transmitter within the scan area, wherein the beam scanner controller is further configured to drive the first and second scanable mirrors such that at least one of the first scanable mirror and/or the second scanable mirror scans at a resonant frequency; and
- an optical field splitter/inverter positioned optically downstream from the first and second scanable mirrors to split and invert the scan area defined by the first and second scanable mirrors; and
- wherein the beam scanner controller comprises:
    - a first driver for controllably scanning the first scanable mirror;
    - a second driver for controllably scanning the second scanable mirror; and
    - a processor configured to compute a periodic phase drift and provide a control signal to the driver for the at least one scanable mirror that scans at the resonant frequency such that the control signal induces the computed periodic phase drift in the scanning of the at least one scanable mirror that scans at the resonant frequency.

41. The apparatus of claim 40 wherein the processor is further configured to:
vary the command signal such that the scanning includes the periodic phase drift over time.

42. The apparatus of claim 40 wherein the processor is further configured to generate the control signal such that the control signal induces the periodic phase drift without altering the fundamental period.

43. The apparatus of claim 40 wherein the processor is further configured to compute the induced periodic phase drift according to a total least squares method using time as an independent variable.

44. The apparatus of claim 40 wherein the processor is further configured to provide the control signal that induces the computed periodic phase drift to only one of the first and second drivers.

45. The apparatus of claim 40 wherein the beam scanner controller is further configured to drive the first and second scanable mirrors such that the first scanable mirror is driven at a first resonant frequency while the second scanable mirror is driven at a second resonant frequency, the first and second resonant frequencies cooperating together so that the ladar transmitter targets within the scan area according to a Lissajous scan pattern; and
wherein the processor is further configured to provide a first control signal to the first driver and a second control signal to the second driver, wherein the first and second control signals induce the periodic phase drift in both the first and second scanable mirrors such that the periodic phase drift is spread across the first and second scanable mirrors.

46. The apparatus of claim 25 further comprising:
the ladar transmitter, wherein the ladar transmitter comprises a light source, the ladar transmitter configured to transmit a plurality of light pulses from the light source via the beam scanner apparatus.

47. The apparatus of claim 46 wherein the ladar transmitter further comprises a processor in cooperation with the light source and the beam scanner apparatus, the processor configured to intelligently select a subset of range points within the scan area for targeting via compressive sensing.

48. A beam scanner apparatus for a ladar transmitter, the apparatus comprising:
a first scanable mirror configured to scan to a plurality of scan positions;
a second scanable mirror positioned optically downstream from the first scanable mirror, the second scanable mirror configured to scan to a plurality of scan positions, wherein the scan positions of the first and second scanable mirrors define where the ladar transmitter is targeted within a scan area; and
an optical field splitter/inverter positioned optically downstream from the first and second scanable mirrors to split and invert the scan area defined by the first and second scanable mirrors, wherein the field splitter/inverter is positioned such that the targeting of the ladar transmitter moves relatively slower in a middle section of the scan area than it does at outer sections of the scan area.

49. The apparatus of claim 48 further comprising a beam scanner controller configured to drive the first scanable mirror to scan at a resonant frequency.

50. The apparatus of claim 49 wherein the beam scanner controller is further configured to drive the second scanable mirror to scan at a resonant frequency.

51. The apparatus of claim 48 further comprising a beam scanner controller configured to drive the second scanable mirror to scan at a resonant frequency.

52. The apparatus of claim 48 wherein the beam scanner controller is further configured to implement a dynamic scan pattern that includes a member of the group consisting of interline skipping and interline detouring.

53. The apparatus of claim 48 wherein the first scanable mirror comprises a MEMS mirror.

54. The apparatus of claim 48 wherein the second scanable mirror comprises a MEMS mirror.

55. The apparatus of claim 25 wherein the field splitter/inverter comprises a triangular prism shape.

56. The apparatus of claim 25 wherein the field splitter/inverter comprises a W shape.

57. The apparatus of claim 26 wherein the first scanable mirror comprises a MEMS mirror.

58. The apparatus of claim 57 wherein the second scanable mirror comprises a MEMS mirror.

59. The apparatus of claim 26 wherein the second scanable mirror comprises a MEMS mirror.

60. The apparatus of claim 26 further comprising:
the ladar transmitter, wherein the ladar transmitter comprises a light source, the ladar transmitter configured to transmit a plurality of light pulses from the light source via the beam scanner apparatus.

61. The apparatus of claim 60 wherein the ladar transmitter further comprises a processor in cooperation with the light source and the beam scanner apparatus, the processor configured to intelligently select a subset of range points within the scan area for targeting via compressive sensing.

62. The apparatus of claim 48 wherein the field splitter/inverter comprises a triangular prism shape.

63. The apparatus of claim 48 wherein the field splitter/inverter comprises a W shape.

64. The apparatus of claim 48 further comprising:
the ladar transmitter, wherein the ladar transmitter comprises a light source, the ladar transmitter configured to transmit a plurality of light pulses from the light source via the beam scanner apparatus.

65. The apparatus of claim 64 wherein the ladar transmitter further comprises a processor in cooperation with the light source and the beam scanner apparatus, the processor configured to intelligently select a subset of range points within the scan area for targeting via compressive sensing.

* * * * *